US008671674B2

(12) United States Patent
Prigent et al.

(10) Patent No.: US 8,671,674 B2
(45) Date of Patent: Mar. 18, 2014

(54) HYDROSTATIC TRANSMISSION DEVICE FOR A MOBILE MACHINE

(75) Inventors: André Prigent, Saintines (FR); Jean Heren, Margny lès Compiègne (FR)

(73) Assignee: Poclain Hydraulics Industries, Verberie (FR)

( * ) Notice: Subject to any disclaimer, the term of this patent is extended or adjusted under 35 U.S.C. 154(b) by 1100 days.

(21) Appl. No.: 12/529,419

(22) PCT Filed: Feb. 29, 2008

(86) PCT No.: PCT/FR2008/050352
§ 371 (c)(1),
(2), (4) Date: Oct. 12, 2009

(87) PCT Pub. No.: WO2008/116996
PCT Pub. Date: Oct. 2, 2008

(65) Prior Publication Data
US 2010/0018200 A1 Jan. 28, 2010

(30) Foreign Application Priority Data
Mar. 1, 2007 (FR) .................................... 07 53598

(51) Int. Cl.
*B60K 17/356* (2006.01)
*B62D 11/18* (2006.01)
(52) U.S. Cl.
USPC .......................................................... 60/424

(58) Field of Classification Search
USPC ................................... 60/424, 464, 468, 484
See application file for complete search history.

(56) References Cited

U.S. PATENT DOCUMENTS 3,788,075 A * 1/1974 Holdeman et al. .............. 60/424

FOREIGN PATENT DOCUMENTS

| DE | 198 33 942 C2 | 2/2000 |
| EP | 1 535 826 A2 | 6/2005 |
| FR | 2 828 544 B1 | 12/2003 |

OTHER PUBLICATIONS

International Search Report: PCT/FR2008/050352.

* cited by examiner

*Primary Examiner* — F. Daniel Lopez
(74) *Attorney, Agent, or Firm* — Ladas & Parry LLP

(57) ABSTRACT

Hydrostatic transmission apparatus for a vehicle having a front group of drive members and a rear group of drive members, a pump, a front motor and a rear motor contributing to driving respective ones of the front and rear groups of drive members; a first one of the motors and a second one of the motors connected to the first motor via a series duct also being connected to the main orifices of the pump, thereby constituting a closed transmission circuit; at least one pressure-limiting valve being interposed between the series duct and a low-pressure circuit, and being suitable for connecting the series duct to the low-pressure circuit while being controlled as a function of the high pressure of the pump. The pressure in the series duct is thus effectively limited to a pressure representative of the pressure necessary for driving the vehicle.

27 Claims, 10 Drawing Sheets

HYDROSTATIC TRANSMISSION DEVICE FOR A MOBILE MACHINE

BACKGROUND OF THE INVENTION

The present invention relates to hydrostatic transmission apparatus for a mobile machine having a front group of drive members and a rear group of drive members, a pump, a front motor and a rear motor contributing to driving respective ones of the front and rear groups of drive members; a first one of said motors referred to as the "first linking motor" and a second one of said motors referred to as the "first linked motor" and connected to said linking motor via a series duct also being connected to the main orifices of the pump, thereby constituting a closed transmission circuit; at least one pressure-limiting valve being interposed between said series duct and a low-pressure circuit.

Such a hydrostatic transmission configuration using a series connection arrangement offers the advantage of making it possible to synchronize the front and rear wheels of a vehicle on difficult terrain and to reduce the risk of wheel spin.

The term "upstream motor" is used below for a motor connected to a series duct and to the delivery orifice of the pump, and the term "downstream motor" is used below for a motor connected to a series duct and to the inlet orifice of the pump. It should also be noted that the terms "linking" and "linked" are independent of whether the motors they designate are upstream motors or downstream motors.

The pressure-limiting valve interposed between the series duct and the low-pressure circuit is for preventing excessive pressure from appearing in the series duct, in particular in certain specific situations that can give rise to such excessive pressure.

Such a problematic situation is constituted, for example, on certain difficult terrains, by violent and brief losses of grip of one or more wheels of the vehicle. Thus, if a wheel driven by an upstream motor suffers such a loss of grip (e.g. on going over a loose stone), that motor accelerates suddenly, thereby generating a rapid increase in the pressure in the series duct that feeds the downstream motor. Due to this sudden increase in pressure, the wheel driven by the downstream motor is destabilized because the torque transmitted by the downstream motor is increased suddenly instead of going gradually to its equilibrium value. The resulting pressure jolts can be very damaging for the hydraulic apparatus, and uncomfortable for the driver.

Another problematic situation is constituted by going round a turn. On turning, the wheels rotate at different speeds; this must be made possible despite the fact that the series duct normally constrains the front and rear motors interconnected by the series duct to rotate at the same speed, and without generating sudden changes in pressure in said series duct.

In order to avoid such sometimes-violent increases in pressure in said series duct, conventional apparatus uses a pressure-limiting valve set to the maximum value allowable by the circuit. That high pressure setting makes it possible to avoid untimely opening of the pressure-limiting valve, which might, in particular, give rise to insufficient pressure and thus to insufficient torque, precisely in situations (loss of grip on turning, etc.) for which high torque is necessary.

However, due to the high pressure setting of the pressure-limiting valve, the pressure can be relatively high in the series duct, and, in addition, sudden variations in pressure remain possible. All this gives rise to unnecessary fatigue in the structures.

Another known solution for solving the problems of pressure increases during turning consists in making provision for opening of the value that is used as a pressure-limiting valve to be dependent on the steering angle through which the wheels are steered, that valve removing the excess flow rate that can appear when the two wheels driven by the hydraulic motors linked via a series duct do not travel the same distance, which applies during turning. However, that solution does not cover all of the above-mentioned problematic situations, because, in particular, it does not eliminate the risks of a sudden increase in pressure in the series duct while the vehicle is traveling in a straight line.

An object of the present invention is, in apparatus of the above-mentioned type, to avoid or at least to limit such sudden increases in pressure, without however suffering from the above-mentioned drawbacks.

This object is achieved by the fact that said at least one pressure-limiting valve is suitable for connecting said series duct to the low-pressure circuit while being controlled as a function of the high pressure of the pump.

Thus, in accordance with the invention, the pressure-limiting valve can connect the series duct to the low-pressure duct when the pressure in said series duct reaches a value determined as a function of the high pressure of the pump. The high pressure of the pump should be understood herein as being the higher of the pressures measured at the main orifices of the pump. Said high pressure represents the load on the system: it corresponds precisely to the torque necessary to drive the vehicle at the precise moment in question.

By making the maximum allowable pressure in the series duct or "limit pressure" dependent upon said high pressure of the pump, the torque transferred instantaneously to the wheels driven by the motors fed in series is limited to a value that is mechanically acceptable. In addition, by means of the invention, the pressure in the series duct is adjusted as a function of the high pressure of the pump, i.e. as a function of the drive torque necessary at the instant in question for the vehicle. Thus, this pressure is adjusted in a manner such that the motors linked to the series duct are not unnecessarily deprived of drive torque, while also avoiding excessive increases in pressure that might give rise to loss of grip.

For example, if, at a given time, a pressure of 150 bars is necessary to cause the vehicle in question to advance, and if an upstream wheel loses grip, the torque that the corresponding downstream motor can develop depends upon the pressure in the series duct between the two motors, said pressure being a function of the 150 bars; while if, under other travel conditions (e.g. while climbing a slope), a pressure of 400 bars is necessary to cause the vehicle to advance, and so the limit pressure to which the pressure in the series duct is limited is different (higher) and takes account of the 400 bars, making it possible for the downstream motor to develop different (higher) torque. The pressure in the series duct is therefore no longer a fixed pressure corresponding to the pressure setting of the above-mentioned prior art fixed valve, which pressure could be 450 bars and could, in the same way as in the preceding situations, give rise to loss of grip of the wheel driven by the downstream motor.

In addition, controlling the pressure-limiting valve as a function of the high-pressure of the pump rather than as a function of its delivery pressure is particularly advantageous for coping successfully with the specific situation arising when the vehicle starts going down a steep slope. The high pressure generated by the weight of the vehicle then occurs in the return duct from the motors towards the pump (the motors then operate as pumps). The delivery pressure of the pump might thus become equal to the pressure of the low-pressure circuit. In this situation, while the pressures in the main ducts are inverted relative to a "normal" situation in which the motors operate as motors, it is necessary for the pressure in the series duct to be able to increase in order to maintain drive torque on the wheels driven by the motor at the front of the vehicle, which motor is preferably the upstream motor. This result is made possible in accordance with the invention by means of the fact that the pressure-limiting valve is controlled as a function of the high pressure of the pump.

In addition, advantageously, said at least one pressure-limiting valve is controlled on the basis of a fraction F of the high pressure of the pump. In particular, it is possible to choose to make provision for said valve to limit the pressure in the series duct to a limit pressure that is a fraction F of the high pressure of the pump, i.e. for said valve to connect the series duct to the low-pressure circuit when the pressure in said duct reaches said fraction F of the high pressure of the pump. This technical solution is both effective and simple to implement as shown by the embodiments presented below.

In general, said fraction F has a predetermined value. Advantageously, said fraction F is less than 1, by lying, for example, in the range 0.7 to 0.95. By choosing a fraction F that is less than 1, the pressure-limiting effect is increased, and the circuits are relieved. For particular applications, said fraction may lie in the range 0.4 to 0.7.

In this situation, the value of the pressure setting of the pressure-limiting valve is less than the high pressure of the pump, which pressure is very often (except in steep-slope situations, for example) the feed pressure of the upstream motor. There is therefore very often a positive pressure difference between the feed and the discharge of the upstream motor; said difference makes it possible for the upstream motor to be capable of delivering drive torque permanently, unlike what would occur if the pressure in the series duct could reach or even exceed the high pressure of the pump.

Limiting the fraction F to a value that is less than 1 is advantageous in particular in a turning situation and when the upstream motor drives the steerable wheels. The steerable wheels travel longer distances than the non-steerable wheels. Therefore, the upstream motor delivers a higher flow rate to the downstream motor than said downstream motor can absorb. The pressure in the series duct then increases, but remains less than the limit pressure in the series duct that is less than the high pressure of the pump. The difference between these two pressures is applied between the inlet orifice and the discharge orifice of the upstream motor, and said upstream motor therefore continues to deliver drive torque.

In addition, in certain particular situations, it is also possible to choose to make provision for said fraction to take a value greater than 1. This applies, for example, for a machine having 4 wheels and 4 motors with two cylinder capacities, or indeed 4 wheels and 2 motors having two cylinder capacities, and that is traveling in reverse. If a wheel equipped with motors having two cylinder capacities loses grip, a large rise in pressure (beyond the high pressure of the pump) can take place in the series line that goes to the other wheel on the same side. By choosing a fraction F having a sufficient value, e.g. 2 or indeed greater than 2, it is possible, in the event of spin or of loss of grip, to use this excessive pressure to give drive back to the vehicle, by giving drive torque back to the wheel linked via the series duct to the wheel suffering loss of grip.

Thus, in a first embodiment of the invention, the pressure-limiting valve may be controlled independently of the travel conditions of the vehicle, e.g. with a pressure-limiting valve controlled on the basis of a fraction F of the high pressure of the pump, and in particular of a predetermined fraction.

In other embodiments of the invention, it is also possible to make provision for said fraction to be adjustable, e.g. on fitting the valve, without this pressure taking account of the travel conditions. This makes it possible to simplify the on-board electronics.

However, it is advantageous for the control of the pressure-limiting valve to take account of particular circumstances.

Thus, advantageously, said at one pressure-limiting valve is also controlled as a function of at least one parameter relating to the operating conditions of the apparatus other than the high pressure of the pump. Said parameter may be at least one parameter chosen from among the inclination of the vehicle (traveling on the flat, climbing, or descending), the steering angle through which the wheels of the vehicle are steered, or the type of vehicle. It may, in particular, serve to determine said fraction F of the high pressure of the pump.

The use of such additional parameters for the control makes it possible in particular to have more power, or, conversely, to reduce the pressure to a greater extent in the series duct, when necessary, as a function of the circumstances as indicated by said parameters relating to the operating conditions.

For optimum use of the above-indicated parameters, the pressure-limiting valve may be controlled by an electronic control unit (ECU). Said unit may either control the pressure-limiting valve directly (the valve is then a solenoid valve), or else control it via an electrical-to-hydraulic conversion pilot stage (the pressure-limiting valve is then a hydraulically-controlled valve).

The hydrostatic transmission apparatus may also have certain features making it possible to optimize operation of said apparatus. First features aim to optimize the internal operation of the apparatus.

Thus, at least one constriction is interposed between said at least one pressure-limiting valve and the series duct(s) to which said pressure-limiting valve is connected. The presence of said constriction generates head loss and advantageously makes it possible to dimension said at least one pressure-limiting valve on the basis of pressures that are lower than the pressures of the series duct(s) to which said pressure-limiting valve is connected.

In addition, at least one non-return device is interposed between said at least one pressure-limiting valve and the series duct(s) to which said pressure-limiting valve is connected, so as to allow fluid to flow only from the series duct(s) towards said at least one pressure-limiting valve. This non-return device prevents the pressure-limiting valve from directing fluid towards the series duct, which is not desirable.

Advantageously, the hydrostatic transmission apparatus further includes control means making it possible to force the non-return device into the open or "through" position. In this position, the fluid can flow in both directions. Therefore, instead of only limiting the pressure in the series duct(s) to a limit pressure, it is possible to force the pressure in said duct(s) to establish itself at that value. This possibility is particularly advantageous in the following circumstances:

Firstly when spin is absolutely to be avoided on the front wheels (when drive is from the front with the front motors being the upstream motors). Under these conditions, it is necessary to limit the drive torque transmitted by the front motors or, in equivalent manner, to limit the pressure variation between the feed and the discharge of the motor(s) driving the front wheels.

Advantageously, this result is obtained by forcing the non-return device to open. The pressure in the series ducts is thus forced to the limit value set at the outlet of the pressure-limiting valve. Since said limit value is usually close to the high pressure of the pump, the pressure difference between the feed and the discharge of the front motors is necessarily small, thereby making it possible to achieve the desired objective.

Secondly, when it is possible to guarantee minimum drive torque on the front wheels, in a situation when feeding is from the rear (the upstream motors are the rear motors), and in a turning situation. During turning, since the front wheels travel longer distances than the rear wheels, and in particular the inner wheels, the fluid flow-rate though the front motors can become insufficient, and the pressure variation between the feed and the discharge of each of said motors can become zero. The vehicle therefore becomes very difficult to handle.

Advantageously, drive torque is given back to the front wheels, and the problem of poor handling is solved by forcing the non-return device into the open position. By doing so, a certain pressure difference is maintained between the feed and the exhaust of each of the front motors, which difference is equal to the difference between the high pressure of the pump and the limit pressure maintained by the pressure-limiting valve(s) in the series duct(s). Forcing the non-return valve thus delivers turning assistance.

It should be noted that the control means making it possible to force the non-return device to open may advantageously be triggered automatically by turning sensors, i.e. sensors that detect the inclinations of the wheels, e.g. inductive sensors. The control means of the non-return device may comprise a solenoid valve suitable for forcing the non-return device to open by applying a pilot pressure. Said pilot pressure may be the boost pressure, or preferably the high pressure of the pump.

In addition, as regards the pressure-limiting valve itself, various types of valve are suitable for performing the desired function.

Advantageously, said at least one pressure-limiting valve is a pressure limiter having a first port (G) suitable for being connected to the low-pressure circuit, a second port (U) suitable for being connected to a series duct, and a moving member suitable for being moved by control means between a first position in which it isolates the first and second ports and a second position in which it interconnects said ports. The control means receive the information about the value of the high pressure of the pump, and, on the basis of said information, cause the moving member of the valve to move between the above-mentioned two positions for reducing excessive pressure in the series duct.

In another embodiment, the above-mentioned pressure limiter may be a pressure regulator also provided with a third port (P) suitable for being connected to the duct of the high-pressure pump, the moving member being suitable, in its first position, for interconnecting the second and third ports. Compared with a conventional pressure limiter having only the two ports G and U, the presence of the port P makes it possible, in particular by interconnecting the second and third ports (P and U), to apply the limit pressure as a function of the control pressure in the port U connected to the series duct.

In addition, the pressure-limiting valve may be constituted by various means. In a preferred embodiment, said at least one pressure-limiting valve is a hydraulically-controlled valve, controlled by a pilot duct suitable for being connected to the orifice of the pump that is at the high pressure. A shuttle-valve connected to the two orifices of the main pump makes it possible to select the orifice of the pump that is at the high pressure, i.e. to select the higher pressure of the pump.

In another embodiment, the pressure-limiting valve may, for example, be an electrically-controlled valve.

Finally, other features for optimizing operation of the apparatus may be provided for adapting operation of said apparatus to match the stresses with which it must cope.

A first feature results from the observation that, when the vehicle is in a normal travel situation, e.g. on the road, the above-mentioned risks of excessive pressure to which the pressure-limiting valve responds are limited. For this reason, the apparatus may have two different configurations, one for the road and one for more difficult work conditions. Thus, advantageously, the apparatus may have a travel (or "road") configuration in which said at least one pressure-limiting valve is suitable for connecting the series duct(s) to the low-pressure circuit while limiting the pressure in said duct(s) to the value of the feed pressure of the low-pressure circuit, and a work configuration in which said at least one pressure-limiting valve is suitable for connecting the series duct(s) to the low-pressure circuit while limiting the pressure in said duct(s) as a function of the high-pressure of the pump.

A second feature aims to make it possible to neutralize the limitation of the pressure in the series duct. For this purpose, advantageously, at least one solenoid valve is interposed between said at least one pressure-limiting valve and the series duct(s) to which said pressure-limiting valve is connected, said solenoid valve having a first position in which it connects the at least one pressure-limiting valve to said series duct(s), and a second position in which it isolates the at least one pressure-limiting valve from said series duct(s).

It can be necessary to make it possible to neutralize the pressure-limiting valve in order to maintain drive torque on the downstream motor, under certain particular circumstances. For example, if a wheel driven by an upstream motor is suffering a major loss of grip, said upstream motor tends to rotate faster and to absorb the entire flow-rate of the pump. The corresponding downstream motor thus receives an increased flow-rate, and the pressure in the series duct should therefore rise. However, if the pressure-limiting valve is active, the pressure in the series duct is limited by said valve, which is controlled as a function of the high pressure of the pump that has itself decreased under the effect of the above-mentioned over-consumption. Under these conditions, the feed pressure of the downstream motor can be insufficient; it is then desirable to neutralize the pressure-limiting valve temporarily, in order to enable the pressure to increase in the series duct so as to give back to the downstream motor the possibility of delivering sufficient drive torque. Conversely, it is recommended not to neutralize the pressure-limiting valve during turning.

Due to the variety of the situations that might require neutralization of the pressure-limiting valve, said solenoid valve may be actuated either by action from the driver of the vehicle using a suitable control (e.g. a push button or any other device), and/or automatically by means of a sensor, e.g. a proximity detector, giving straight-line or turning information to an electronic unit that can thus transmit to the solenoid valve a blocking signal in a straight-line situation or an opening signal in a turning situation.

It should also be noted that the above-mentioned additional features (work configuration and road configuration, neutralization of the pressure-limiting valve) can be brought together in a single solenoid valve, interposed between the pressure-limiting valve and the series duct(s).

For this purpose, a solenoid valve is used that is connected at its inlet to the outlet orifice of the pressure-limiting valve, and to the low-pressure circuit, and that is connected at its outlet to the series duct(s).

This solenoid valve has the same positions as the above-indicated positions of the solenoid valve for neutralizing the pressure-limiting, so as to connect the pressure-limiting valve to the series duct(s) or so as to isolate them. It also has a new third position, in which the low-pressure circuit is connected to the series duct(s).

The advantage of this solenoid valve is firstly to simplify the hydraulic transmission apparatus by combining various functions in a single part. But it is also, by means of said third position, to make it possible, in simple manner, for the apparatus to operate in the above-mentioned road configuration.

In general, the hydrostatic transmission apparatus of the present invention may equip any vehicle having the characteristics presented in the introduction. However, it should be noted that the apparatus is not limited to a vehicle having a single linking motor and a single linked motor: on the contrary, other motors, be they linking or linked, can also be part of the apparatus. In particular, the front group of motors and/or the rear group of motors may include dual motors, i.e. motors each made up of two sub-motors having distinct feed and/or discharge orifices.

For example, in another possible configuration of apparatus that is referred to as a "configuration with a dual motor", said first linking motor is a first elementary motor of a first dual motor, and said first dual motor also has a second elementary motor that is fed by the pump in parallel with said first linking motor and with said first linked motor that are interconnected in series.

In another possible configuration, in addition to the configuration with a dual motor, the apparatus also includes a second dual motor, the first elementary motor of which is connected firstly via a second series duct to the first linked motor, and secondly to the pump, and of which the second elementary motor is fed by the pump in parallel with said first linking motor and with said first linked motor that are interconnected in series.

In yet another possible configuration, in addition to the configuration with a dual motor, the apparatus further includes another motor referred to as the "second linked motor", and a second dual motor of which a first elementary motor is connected firstly via a second series duct to the second linked motor, and secondly to the pump, and of which the second elementary motor is fed by the pump in parallel with said first linking motor and with said first linked motor that are interconnected in series.

When the apparatus includes a plurality of series ducts, the apparatus may advantageously have only a single pressure-limiting valve interposed between the low-pressure circuit and one or more series ducts.

BRIEF DESCRIPTION OF THE DRAWING FIGURES

The invention can be well understood and its advantages appear more clearly on reading the following detailed description of embodiments shown by way of non-limiting example. The description refers to the accompanying drawings, in which.

Figure 8A:
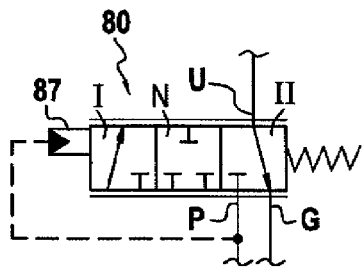
Figure 8B:
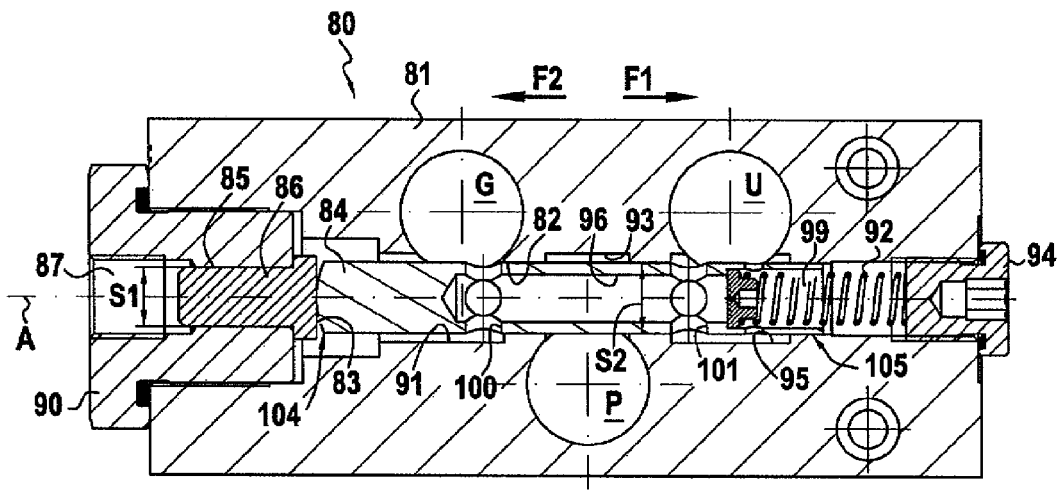
Figure 8C:
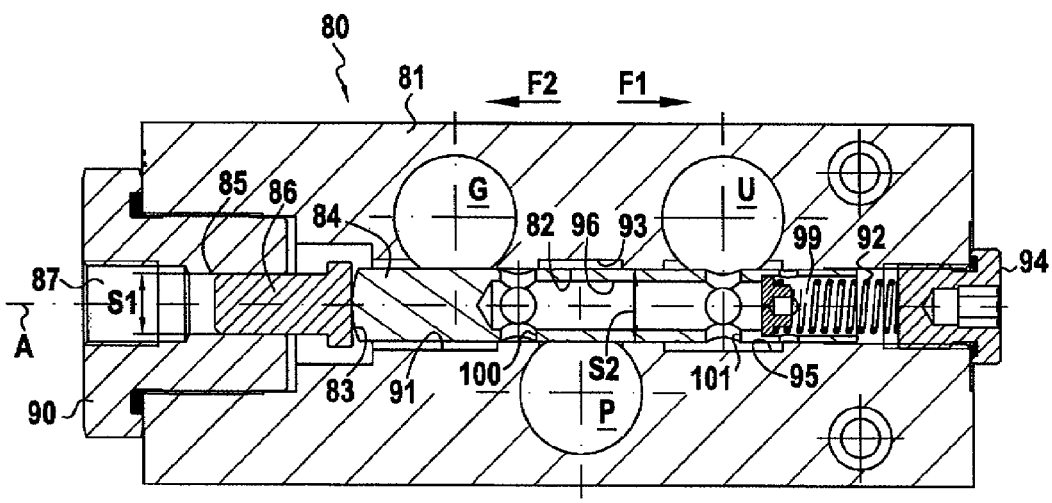
Figure 9A:
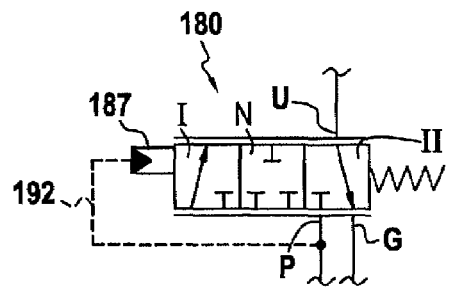
Figure 9B:
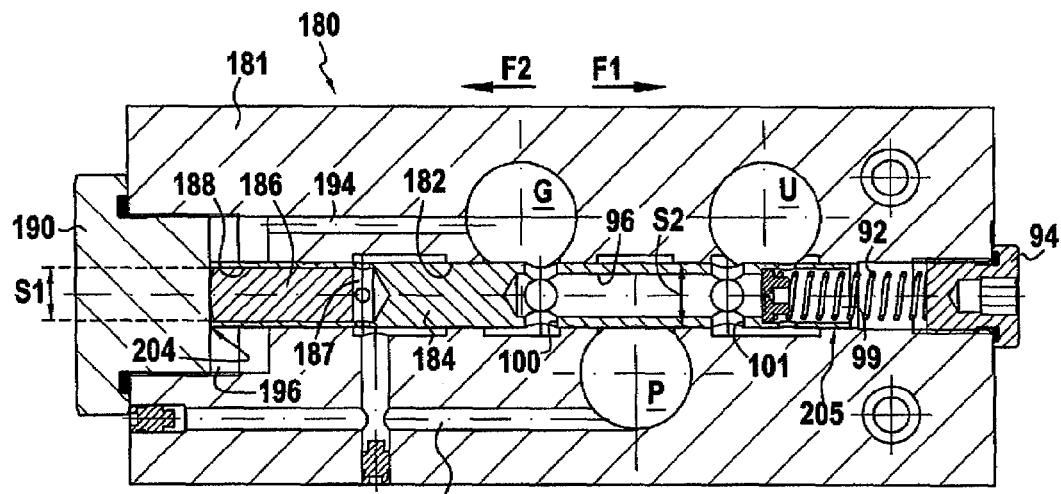
Figure 9C:
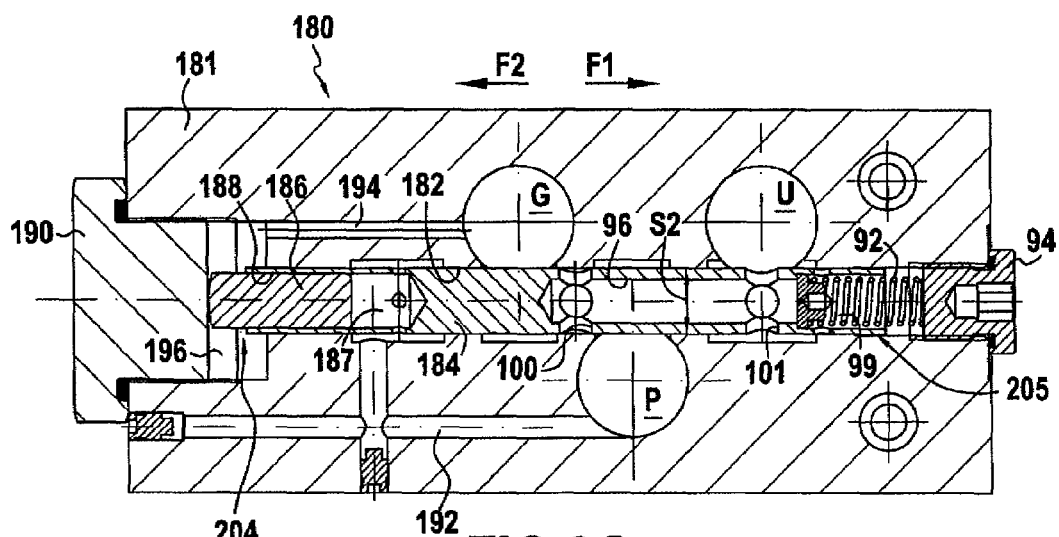
Figure 10:
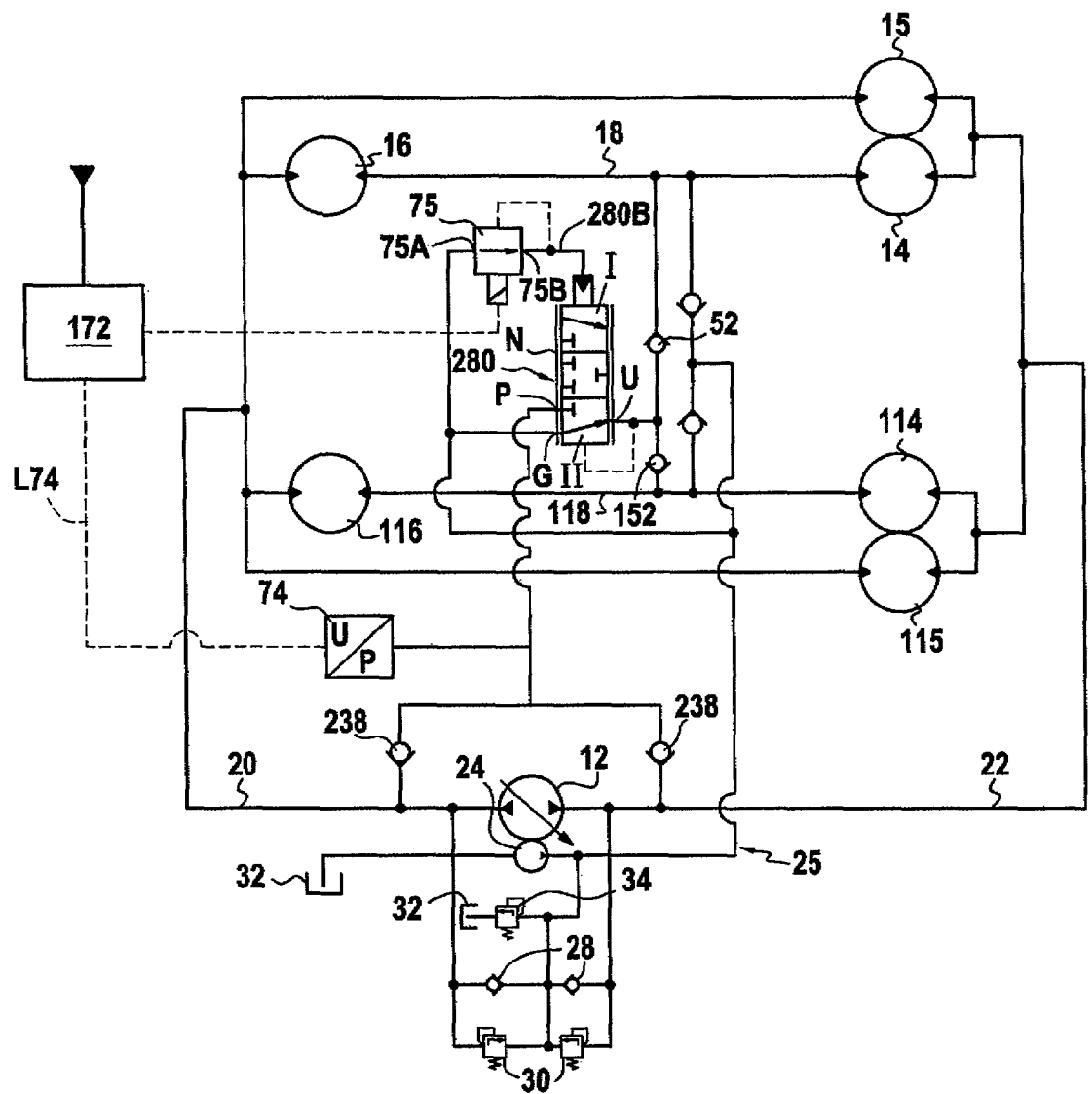

FIGS. 8A to 8C and FIGS. 9A to 9C show respective ones of two embodiments of a pressure regulator (which is an example of a pressure-limiting valve) that is part of hydrostatic transmission apparatus of a vehicle of the invention; and FIG. 10 is a diagrammatic view of another embodiment of hydrostatic transmission apparatus of the invention with hybrid electrical-and-hydraulic piloting of the pressure-limiting valve.

DETAILED DESCRIPTION OF THE PREFERRED EMBODIMENTS

In the various embodiments shown and in the corresponding figures, those elements that appear several times bear the same references and are described with reference to the first figure in which they appear.

A first embodiment of the invention is described below with reference to FIG. 1.

The hydrostatic transmission apparatus that is shown includes a closed transmission circuit in which the following are placed in series: a main hydraulic pump 12, a "linking" first motor 14, and a "linked" second motor 16. These two motors that are interconnected via a series duct 18 are fed by said main pump 12 by means of respective ones of two main ducts 20 and 22 that are connected to the orifices of the pump.

The apparatus further includes a front group of drive members (not shown) and a rear group of drive members (not shown), which groups are driven by respective ones of the motors 14 and 16. The drive members are typically wheels or rollers. A motor can drive a single drive member or a plurality of members, e.g. two wheels on a common axis.

The apparatus further includes a low-pressure circuit 25 that, in this example is the boost circuit. Any other low-pressure circuit suitable for removing the fluid can also perform this function.

The low-pressure circuit 25 has a boost duct 27 and a booster pump 24 that feeds the low-pressure circuit 25. The inlet orifice of the booster pump 24 is connected to a pressure-free reservoir 32. The low-pressure circuit 25 is connected to the main ducts 20 and 22 of the main pump 12, and to the series duct 18 interconnecting the two motors, so that a minimum pressure or "boost pressure" is maintained permanently in said ducts. Valves 28 are interposed on the various corresponding parallel-connection links, which valves guarantee that the fluid flows only in the direction in which the ducts 18, 20, 22 are filled by the booster pump 24.

In conventional manner, the pressure in the main circuit and in the low-pressure circuit is limited by pressure limiters 30, 34.

Finally, the apparatus includes a pressure-limiting valve 40 connected via a link duct 43 to the series duct 18, and via a link duct 41 to the low-pressure circuit 25, while being controlled as a function of the high-pressure of the main pump 12. In the example shown, said valve 40 is a pressure limiter that is controlled hydraulically by the high-pressure of the pump.

A shuttle-valve 38 connected to the two orifices of the main pump 12 makes it possible to select the higher pressure of said pump. Said pressure is thus transmitted directly in order to control the hydraulically-controlled valve 40.

The pressure-limiting valve 40 has a first port G connected to the low-pressure circuit 25, a second port U connected to the series duct 18, and a moving member (not shown in FIG. 1) suitable for being moved between a first position in which it isolates the first and second ports (G and U) and a second position in which it interconnects said ports.

The valve 40 is controlled as a function of the pressure in a control chamber 40A fed via a pilot duct 40B put under the high pressure of the pump, a counter-pressure opposing the said high pressure, which counter-pressure is the pressure of the duct 43 in the vicinity of the valve 40 or the pressure at the port U.

Operation of the valve 40 is described in detail below. At rest, the valve 40 is in the first position, and the ports U and G are isolated.

So long as the pressure in the port U does not exceed a limit pressure that depends on the high-pressure of the pump (which pressure is determined, in particular, by the structure of the valve 40), the valve 40 remains closed. When the pressure in the port U reaches said limit pressure, the valve 40 opens, the ports G and U are put into communication with each other, and the surplus fluid is removed from the series duct 18 to the high-pressure circuit 25.

It results from the above that the pressure in the port U is maintained by the valve 40 at a value less than or equal to said limit pressure. This pressure is determined in particular by the structure of the valve 40. The valve must thus be chosen in a manner such that the pressure limitation as a function of the high pressure of the pump that is performed by the valve 40 does indeed deliver a pressure that is appropriate for limiting excessive pressure in the series duct 18.

In addition, a constriction 36 is interposed between the pressure-limiting valve 40 and the series duct 18 to which said valve is connected. Said constriction 36 makes it possible to limit the flow rate removed via the valve 40. In the particular situation in which the high pressure of the pump is low, e.g. if the wheel driven by the upstream motor is temporarily off the ground, it can be advantageous to limit the flow-rate removed via the valve 40, and thus to prevent the wheel from racing.

In other situations, the constriction is not necessary. It does not adversely affect operation because it does not modify the pressure at which the valve 40 opens, since the stabilized pressures upstream and downstream from the constriction are equal when the valve 40 is closed. When the limit pressure is reached, and when the valve opens, the flow-rate to be removed is, in general very small, and the head loss generated by the constriction has little influence.

A second embodiment of the invention is described below with reference to FIG. 2.

Figure 2:
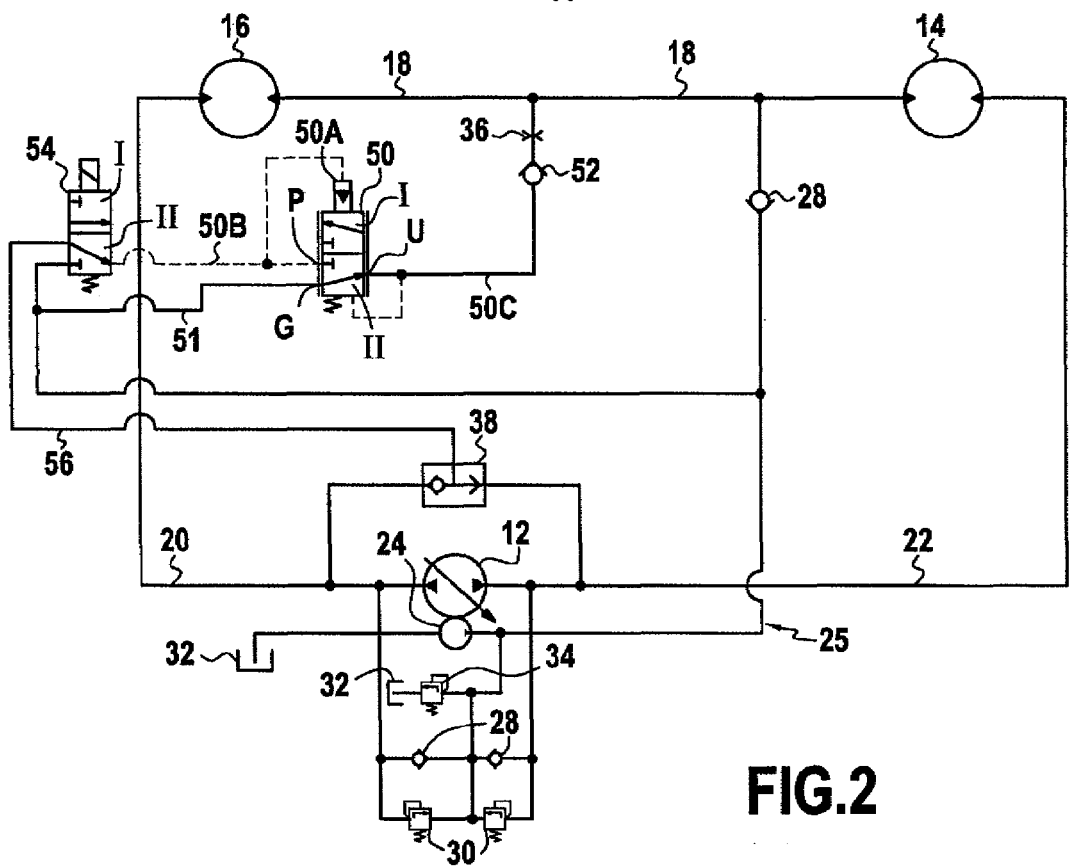
FIG. 2 is a diagrammatic view of hydrostatic transmission apparatus of the invention, further having a first solenoid valve for selecting a work mode and a road mode, and in which said pressure-limiting valve is a pressure regulator.

In the hydrostatic transmission apparatus shown in FIG. 2, the pressure-limiting valve 50 is a pressure regulator. It has a first port G connected to the low-pressure circuit 25, a second port U connected to the series duct 18, and a third port P, connected to a solenoid valve 54 via a "pilot" duct 50B via which it is put under a control pressure.

More precisely, the port U is connected to a series duct 18 via a link duct 50C, a non-return or "check" valve 52 and a constriction 36 being interposed in succession along said duct 50C going from the port U to the series duct 18. The non-return valve 52 is placed in the direction in which it prevents fluid from coming back up from the valve 50 to the series duct 18.

The valve 50 also has a hydraulic control chamber 50A put under said control pressure by being connected to the pilot duct 50B. The pressure in the chamber 50A opposes the combined counter-pressure from the return spring and from the pressure in the port U.

When the pressure in the port U does not exceed a "limit" pressure, dependent upon the control pressure, the valve 50 is placed in position I. In this position, the ports P and U are interconnected and the port G is isolated. As a result, in this position, the link duct 50C can exchange fluid with the pilot duct 50B; its pressure thus tends to become closer to the control pressure; the duct 51 for removal towards the boost remains isolated.

When the pressure in the port U reaches the limit pressure, the valve is placed in position II, which, in view of the return spring, is the rest position of the valve 50. In this position II (FIG. 2), the ports G and U are interconnected, and the port P is isolated. As a result, in this position, the link duct 50C is put into communication with the low-pressure circuit 25 and removes the fluid thereto. The pressure at U thus tends to decrease, and does so so long as the pressure at U remains greater than the limit pressure (it being possible to ignore the influence of the return spring). The pressure at U is stabilized when it reaches the limit pressure.

Thus, given the above, the valve 50 constrains the pressure in the link duct 50C (pressure at the port U) to be maintained constantly equal to the limit pressure, which depends on the control pressure and is determined by the structure of the valve 50. In practice, it is possible to set a limit pressure equal to a fraction of the high pressure of the pump, e.g. 80% or 90% of said high-pressure.

Depending on whether the configuration desired for the vehicle is its travel configuration or its work configuration, the apparatus shown diagrammatically in FIG. 2 makes it possible to give two different values to the control pressure, either the high pressure of the pump, or the pressure of the low-pressure circuit 25.

The apparatus includes a solenoid valve 54 which, in the travel configuration, is suitable for taking up a first position I in which the pilot duct 50B is connected to the low-pressure circuit, and, in the work configuration, is suitable for taking up a second position II in which the pilot duct 50B is connected to the duct of the high-pressure pump.

The first position I corresponds to a "road" configuration in which the control chamber 50A of the pressure-limiting valve 50 communicates with the low-pressure circuit 25. In this "road" position, this solenoid valve 54 makes it possible to place the valve 50 in a position in which it limits the pressure at U and thus in the series duct to the boost pressure. Thus, this "road" configuration prevents the pressure from being allowed to rise unnecessarily in the series duct beyond the boost pressure, the "work" configuration of the apparatus being to be reserved for work conditions that are difficult for the vehicle. In the "road" position, the downstream motor does not deliver any drive torque.

The second position II corresponds to the vehicle's "work" configuration that should be used in particular for "all terrain" work, and in which the control chamber 50A of the valve 50 communicates with the high pressure of the pump. This second position is the rest position of the solenoid valve 54, as urged back by a return spring.

A third embodiment of the invention is described below with reference to FIG. 3.

This embodiment differs from the preceding embodiment by the configuration of the motors and by the presence of an additional solenoid valve 60 interposed on the link duct 50C between the port U and the non-return valve. This solenoid valve makes it possible to neutralize the pressure-limiting valve 50, which is an advantage in certain specific situations, as described above. In a first position I, which is its rest position by means of a return spring, it puts the series duct into communication with the valve 50; in a second position II, it isolates them.

Figure 1:
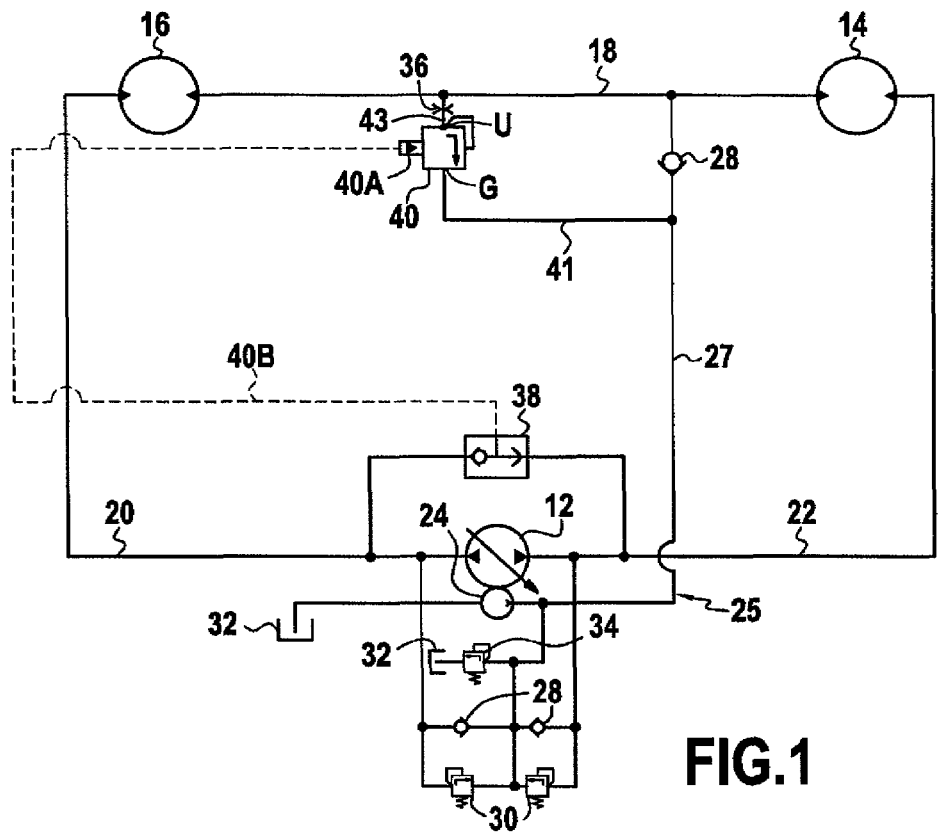
FIG. 1 is a diagrammatic view of hydrostatic transmission apparatus of the invention, including a front motor and a rear motor, and in which said pressure-limiting valve is a pressure limiter.

In addition, the configuration of the motors in this embodiment is different from their configuration as shown in FIGS. 1 and 2. In the embodiment shown in FIG. 3, the linking motor 14 is actually a sub-motor of a dual motor, which dual motor also includes a second sub-motor 15. The sub-motor 15 is connected directly to the main orifices of the main pump 12, and therefore in parallel with the motors 14 and 16 that are interconnected via the series duct 18.

Figure 4:
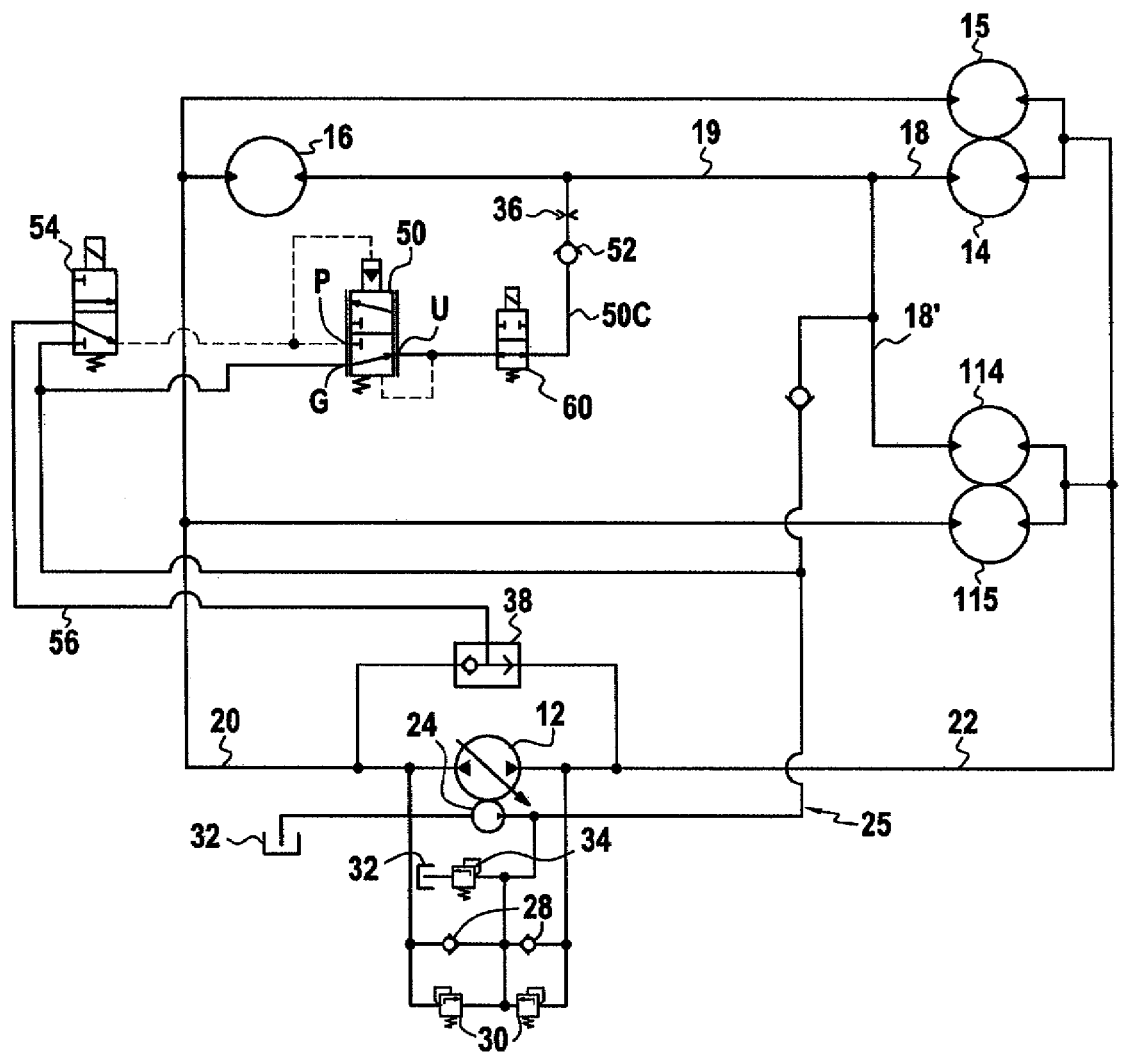
FIG. 4 is a diagrammatic view of hydrostatic transmission apparatus of the invention, including a single motor and two dual motors.

A fourth embodiment is described below with reference to FIG. 4.

Figure 3:
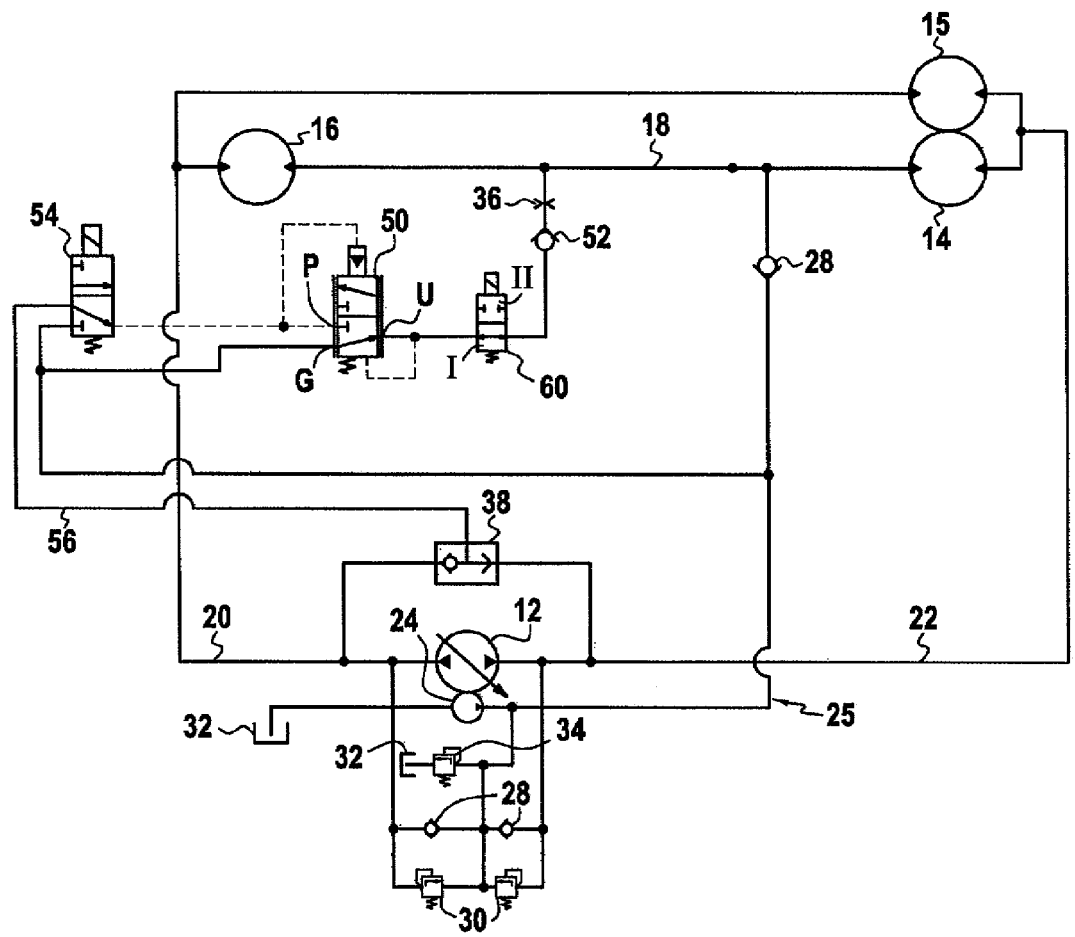
FIG. 3 is a diagrammatic view of hydrostatic transmission apparatus of the invention, including a single motor and a dual motor, and having a solenoid valve for making it possible to neutralize the pressure limitation in the series duct.

In this embodiment, the configuration of the motors is different from the configurations shown in FIGS. 1, 2, and 3. The apparatus firstly includes two dual motors, each of which comprises two sub-motors 14, 15, 114, 115, and secondly a single motor 16. In the example shown, the sub-motor 14 is a first linking motor that is connected via a series duct 18 to the linked motor 16. The sub-motor 114 is another linking motor that is connected via a second series duct 18' to the linked motor 16. As can be seen in FIG. 4, the two ducts 18 and 18' include a common segment or "duct" 19 that connects them to the motor 16.

In spite of the presence of two linking motors 14, 114 and of two series ducts 18, 18', the pressure limitation function provided by the valve 50 is performed as above by a single valve 50, connected in parallel with the series duct 19 via the link duct 50C. However, it is possible to use two pressure-limiting valves connected to respective ones of these ducts.

A fifth embodiment of the invention is described below with reference to FIG. 5A.

In this embodiment, the configuration of the motors is different from the configuration shown in FIGS. 1 to 4. The apparatus includes firstly two dual motors, each of which comprises two sub-motors 14 & 15 and 114 & 115, and secondly two single motors 16 & 116. In the example shown, the sub-motors 14 and 114 are constituted by first and second linking motors, and the motors 16 and 116 are constituted by first and second linked motors that are connected to respective ones of the linking sub-motors 14 and 114 via respective ones of two series ducts 18 and 118. Thus, via its main ducts 20, 22, the pump feeds the sub-motor 15, the sub-motor 115, the pair of motors 14 & 16 that are interconnected in series, and the pair of motors 114 & 116 that are interconnected in series.

For vehicles having four wheels, a motor (16, 116) is assigned to each front wheel, and a pair of elementary motors (14, 15; 114, 115) is assigned to each rear wheel.

The function of pressure limitation in the series ducts 18 and 118 is performed by a single pressure-limiting valve 50. This valve is connected via the link duct 50C to two link ducts 23, 123 that connect the end of the duct 50C to respective ones of the series ducts 18 and 118: a first link duct 23 connects the link duct 50C to the series duct 18, via a non-return valve 52 and a constriction 36; and a second link duct 123 connects the link duct 50C to the series duct 118, via a non-return valve 152 and a constriction 136.

Figure 5A:
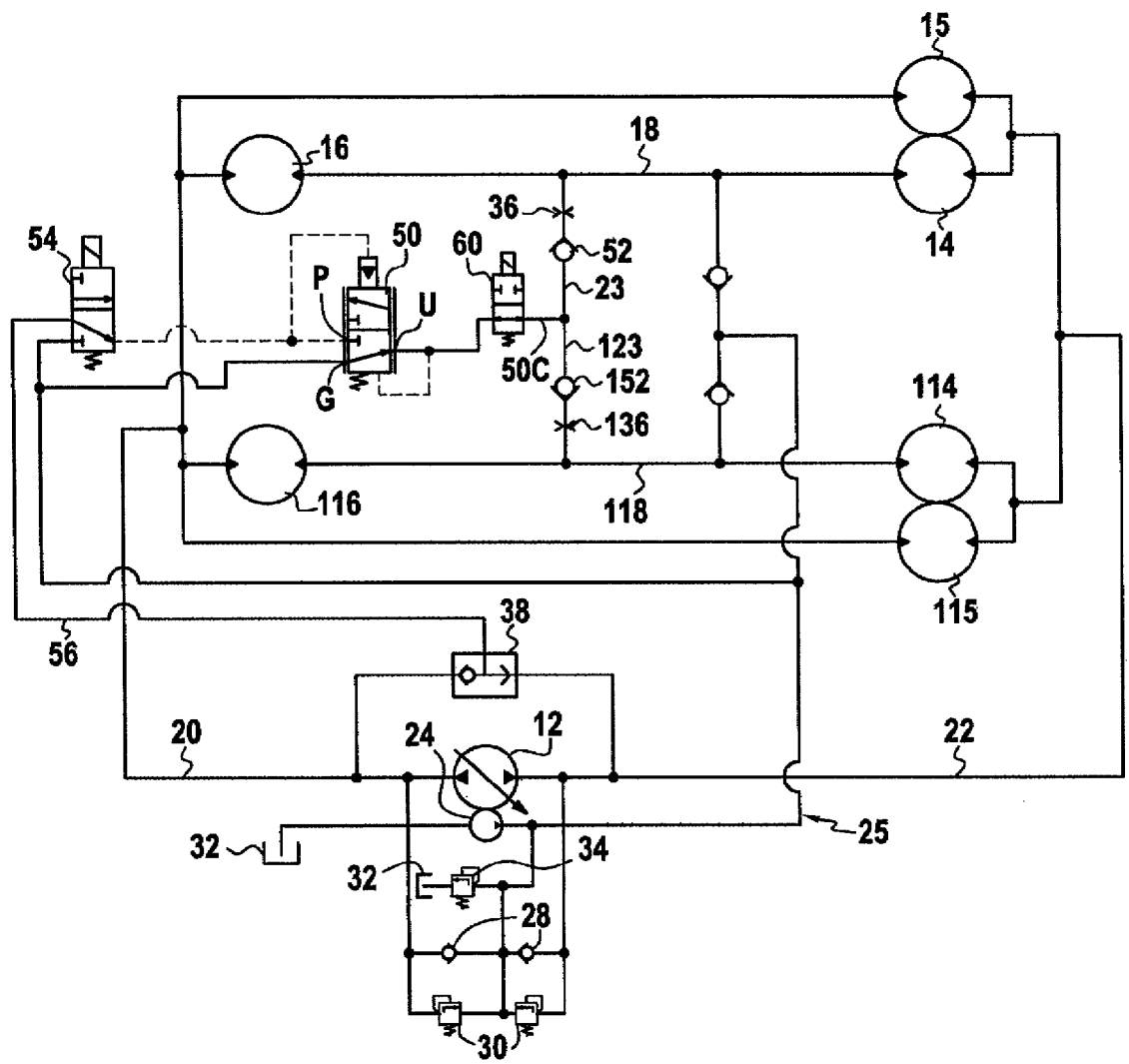
FIGS. 5A and 5B are diagrammatic views of two different embodiments of hydrostatic transmission apparatus of the invention, each embodiment of the apparatus including two single motors and two dual motors.

As can be seen in FIG. 5A, the pressure-limiting valve 50 interposed between the low-pressure circuit 25 and one or more series ducts (the two series ducts 18 and 118 in this example) is a single valve. This configuration is thus inexpensive and relatively simple to implement. In general, although the examples shown include at the most only two series ducts, the invention is applicable to hydrostatic transmission apparatus including more than two series ducts.

A sixth embodiment of the invention is described below with reference to FIG. 5B. In the transmission apparatus shown in FIG. 5B, the configuration of the motors, and the pressure-limiting valve 50, are identical to what is shown in FIG. 5A. However, the environment of the pressure-limiting valve, in particular for having a work mode, a road mode, and an isolation mode, is different.

Figure 5B:
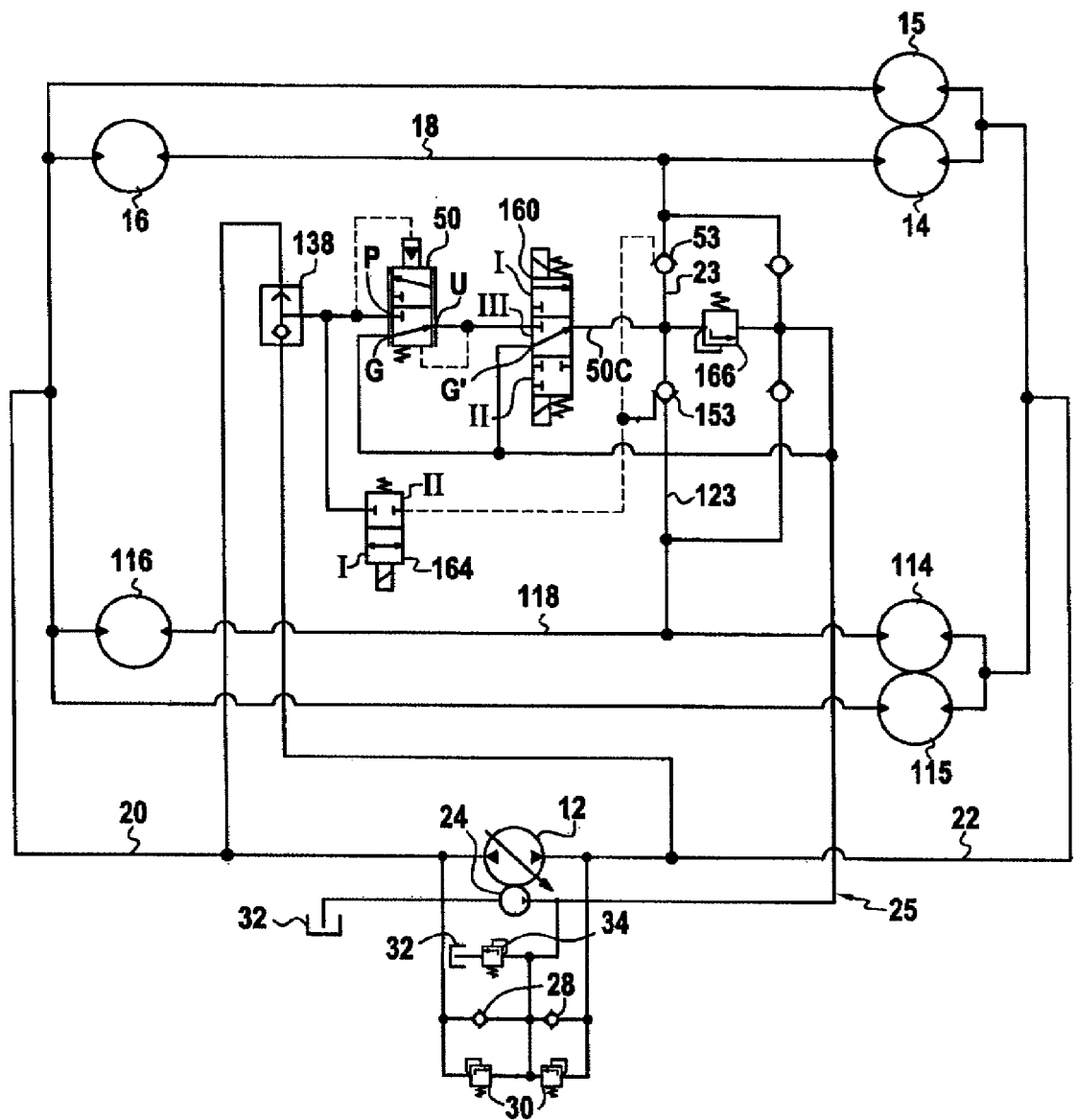

In the hydraulic transmission apparatus of FIG. 5B, the port P of the pressure-limiting valve 50 is connected to a shuttle-valve 138 that is itself connected to the main orifices of the pump 1. This shuttle-valve thus applies the high-pressure of the pump 12 to the port P.

The port G of the pressure-limiting valve 50 is connected to the low-pressure circuit 25. By design, the pressure-limiting valve 50 thus constrains the pressure in its port U to take a value that is a function of the high pressure of the pump, e.g. 80% or 90% of that pressure.

The port U of the valve 50 is connected to a link duct 50c that splits into two link ducts 23, 123 connected to respective ones of the series ducts 18, 118. Piloted valves 53, 153 are provided on respective ones of these link ducts 23, 123. When they are not forced into the open position, these valves perform a non-return-valve function by preventing fluid from passing towards the series ducts 18, 118.

In addition, a mode selector valve 160 is interposed between the port U of the pressure-limiting valve and the series ducts 18, 118 on the duct 50C. This valve 160 is a solenoid valve that can be controlled manually, for example, or by an electronic control unit. It has three positions I, II, III.

Position I is for the work mode. In this position, the port U of the pressure-limiting valve 50 is in communication with the series ducts 18, 118, via the piloted valves 53, 153. The pressure in the series ducts is thus upwardly limited by the limit pressure set by the pressure-limiting valve 50.

Position II is for the isolation mode. In this position, the duct SOC is cut off and cannot remove fluid. The pressure in the series ducts is then not upwardly limited.

Position III is for the road mode. For this mode, the mode selector valve 160 has a port G' connected to the low-pressure circuit. In the position III, the orifice G' is put into communication with the series ducts 18, 118.

As a result, in this mode, the pressure in the series ducts is equal to the pressure in the low-pressure circuit, and thus, the rear motors do not deliver any drive torque, through lack of sufficient feed pressure.

In addition to the pressure limiting performed in the series ducts by the valve 50, safety additional fluid removal is made possible by a link connecting the ducts 23, 123 to the low-pressure circuit, via a pressure limiter 166, in order to avoid excessive pressure in the series ducts 18, 118.

Finally, the hydraulic transmission apparatus presented in FIG. 5B is further provided with control means, namely a solenoid valve 164 making it possible to force the piloted valves 53, 153 open. This solenoid valve 164 is connected to the port P of the pressure-limiting valve 50. In a first position (I), it applies the pressure of the port P to the control members of the valves 23, 123, whereas in a second position (II), said control members remain isolated.

In the first position, the valves 23, 123 are open. Thus, in the work position (position I of the mode selector valve 160), a pressure is set in the series ducts 18, 118 that is equal to the pressure of the port U of the pressure-limiting valve 50. Low but non-zero drive torque is thus applied to the front motors (e.g. if the pressure at U is equal to a large fraction of the high pressure of the pump, e.g. to 80% of said high pressure, then the pressure drop between the inlet and the discharge of each of the front motors is equal to only 20% of the high pressure of the pump, and said front motors can thus deliver only a relatively low drive torque).

Such operation is particularly advantageous for preventing the front wheels from spinning, when feeding is from the front, e.g. during climbing.

Forcing the valves 23, 123 into the open position is also advantageous for imparting minimum drive torque to the front wheels when feeding is from the rear, and during turning. This gives the vehicle back a certain amount of ease of handling during turning, by guaranteeing drive torque on the front wheels (in which case, the pressure difference between the feed and the discharge of the motor is equal to the difference between the pressure in the port U and the low-pressure of the pump).

A seventh embodiment of the invention is described below with reference to FIG. 6. In the transmission apparatus shown in this figure, the configuration of the motors is identical to the configuration shown in FIG. 5. However, the shaping of the pressure-limiting valve is different.

The apparatus includes a first pressure-limiting valve 70 interposed between the series duct 18 and the low-pressure circuit, and also includes a second pressure-limiting valve 170 interposed between the second series duct 118 and the low-pressure circuit 25.

Figure 6:
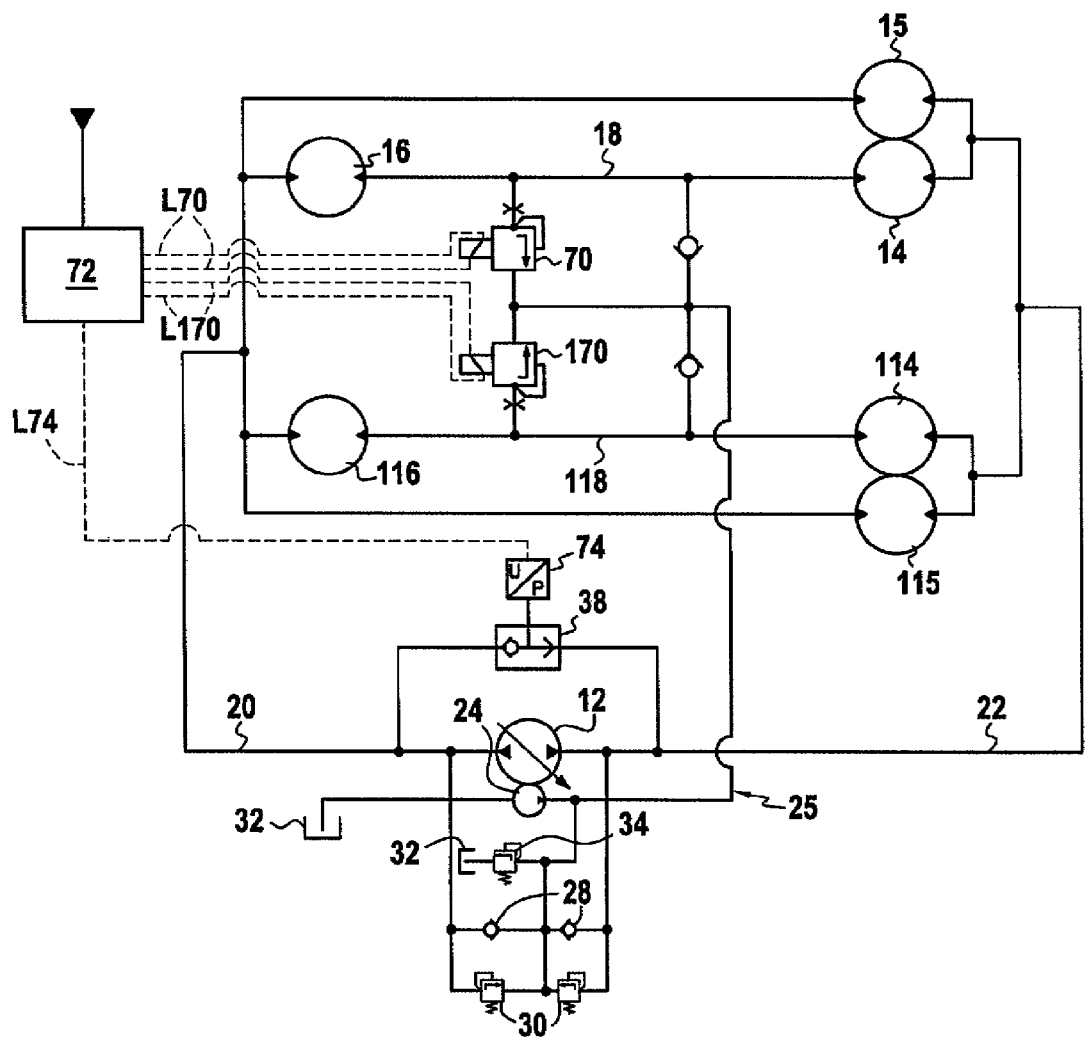
FIG. 6 is a diagrammatic view of hydrostatic transmission apparatus of the invention, including two single motors and two dual motors, and in which said pressure-limiting valve is controlled by an electronic control unit.

In the example shown in FIG. 6, the pressure-limiting valves 70, 170 are pressure limiters. They perform the same function as the pressure limiter of FIG. 1. However, they are controlled electrically, whereas the limiter of FIG. 1 is controlled hydraulically. Such electrical control is naturally possible on all of the devices described with reference to FIGS. 1 to 7.

In order to enable the limiters 70, 170 to be controlled electrically, the apparatus includes an electronic control unit 72, and means L74 for transmitting to said unit at least the value of the high pressure of the pump, said unit 72 being suitable for generating one or more control signals on the basis, in particular, of the value of said high pressure of the pump.

In the example shown, the electronic control unit 72 is connected via a link L74 to a pressure sensor 74. Said pressure sensor is connected to a shuttle-valve 38 at which a pressure measurement is taken, which measurement is then transmitted to the electronic control unit 72. On the basis of the pressure measurement that is taken, the electronic control unit generates the control signals for controlling the pressure limiters 70 and 170, which signals are transmitted to the limiters via the links L70 and L170. The links L70, L170, and L74 can be wired or otherwise.

Figure 7:
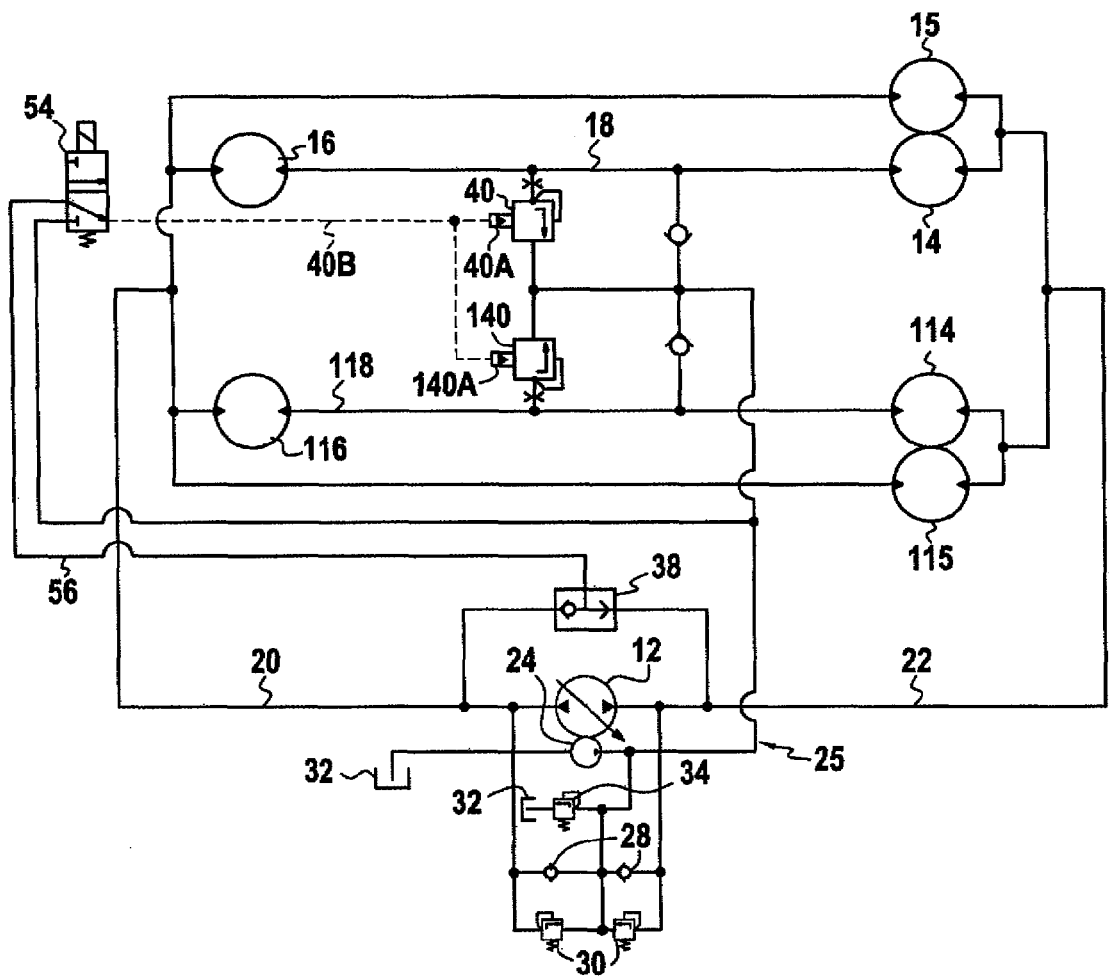
FIG. 7 is a diagrammatic view of hydrostatic transmission apparatus of the invention, including two single motors and two dual motors, in which the two series lines are protected by respective ones of two pressure limiters.

An eighth embodiment of the invention is described below with reference to FIG. 7. In the transmission apparatus presented in this figure, the configuration of the motors is identical to the configuration that is presented in FIG. 6. As in FIG. 6, the apparatus has two pressure limiters 40, 140 that are controlled hydraulically, and operation of which is described above with reference to FIG. 1.

The pressure limiters 40, 140 are controlled via a pilot duct 40B connected to an orifice of the solenoid valve 54, operation of which is described above with reference to FIG. 2. The fluid removed by the pressure limiters 40, 140 is directed to the low-pressure circuit 25.

Two embodiments of a pressure regulator as a pressure-limiting valve of the invention are described below in more detail. In these embodiments (FIGS. 8A to 8C, and 9A to 9C), the regulator is controlled hydraulically, and the regulator can, for example, be used like the pressure regulator of the apparatus presented in FIGS. 2 to 5. Another embodiment is presented below with reference to FIG. 10, with hybrid electrical-and-hydraulic control of the regulator, the electrical control being provided by an electronic control unit.

The first embodiment of the pressure regulator is described below with reference to FIGS. 8A to 8C.

The pressure regulator 80 has a body 81, inside which a substantially cylindrical bore 82 extends along an axis A, the bore opening out onto two opposite faces of the body 81 in the embodiment shown. A moving member 84 that is elongate along an axis that coincides with the axis of the bore is slidably mounted inside said bore 82. Said moving member is caused to slide by the following elements:

At its first end, 104, the moving member 84 is pushed away by an end wall 83 of a moving abutment 86. On its side opposite from said end wall 83, said moving abutment 86 also has a cylindrical extension 85 engaged in leaktight manner in a substantially cylindrical chamber 87 that constitutes a first hydraulic chamber and that is in communication with the outside of the body 81. More precisely, in the example shown, this hydraulic chamber 87 is open in guide part 90 that is itself screwed into the body 81. The cross-section of the hydraulic chamber 87 at the cylindrical extension 85 defines a first control surface of area S1 at which the pressure of the fluid tends to push away the moving abutment 86 and thus the moving member 84 towards the second end 105 thereof (arrow F1). In the apparatus of the invention, the fluid pressure inside the chamber 87 is the control pressure for controlling the valve 80, i.e. generally (in the work configuration) the high pressure of the pump.

In other embodiments, the moving member and the moving abutment 86 can constitute a single common part.

At its second end 105 (on the right of FIGS. 8B and 8C), the moving member 84 is pushed away by a spring 92. That end of the spring that is opposite from the moving member 84 bears against the body 81, either directly, e.g. if the bore is blind, or indirectly, e.g. as shown, via a stationary bearing part 94 mounted on the body 81 by screw-fastening.

In addition, the body 81 is provided with three communication ports G, P, and U suitable for putting the external ducts connected to the pressure regulator 80 into communication with the bore 82 at respective annular grooves 91, 93, and 95 provided in the bore 82. Said ports G, P, and U are, in this example, arranged perpendicularly to the axis of the bore 82.

In general, in the hydrostatic transmission apparatus of the invention, the port P is put under the control pressure of the valve, i.e. typically the high pressure of the pump in the work configuration, the port G is connected to the low-pressure or boost circuit, and the port U is connected to the series duct(s).

The port U is in communication with a second hydraulic control chamber 99 that is part of the bore 82 and at which the second end 105 of the moving member 84 terminates. Thus, the pressure of the fluid coming from the port U tends to push away the second end 105 of the moving member 84 as indicated by the arrow F2 at said second control chamber 99, the cross-section of which defines a second control surface of area S2. The forces that push away the second end 105 of the moving member 84 are thus the pressure in the port U and the return force of the spring 92. Since said return force is small compared with the hydraulic pressure forces, it is ignored below.

Thus, said pressure limiter has a first hydraulic control chamber 87 that can be connected to a pilot duct, and a second control chamber 99 acting in opposing manner relative to the first chamber, and suitable for being connected to a series duct via the port U; the opposing pressures exerted in the two chambers on the ends of the moving member 84 cause said moving member to move.

The moving member 84 is also provided with an internal axial bore 96. In addition, it is provided with holes 100 and 101 that are provided radially at respective ones of two cross-sections and that put the bore 96 into communication with the outside: the holes 100 put the bore 96 into communication either with the port P or with the port G, as a function of the position of the moving member 84 in the body 81; and the holes 101 put the bore 96 into communication with the port U.

Thus, the bore 96 makes it possible to put the port U selectively into communication with one of the ports P or G as a function of the position of the moving member 84.

The pressure-limiting function performed by the pressure regulator 80 is described in detail below.

The moving member 84 receives opposite forces due to the respective pressures $P_{CONTROL}$ and $P_U$ in the two opposing control chambers 87 and 99 of respective cross-sections S1 and S2. When these forces are in equilibrium, the following equation is thus satisfied: $P_{CONTROL} \times S1 = P_U \times S2$, and therefore $P_U = (S1/S2) \times P_{CONTROL}$, where $P_{CONTROL}$ is the pressure in the chamber 87 (the control pressure) and $P_U$ is the pressure at the port U. Thus, the regulator 80 is designed to regulate the pressure at U to a limit pressure equal to $F \times P_{CONTROL}$, where F is equal to the fraction (S1/S2) or "control fraction" for controlling the regulator that explicitly defines the pressure-limiting function performed by the regulator.

Thus, in this pressure regulator 80, the moving member of said pressure limiter or pressure regulator has first and second control surfaces (S1, S2) situated in respective ones of the first and second control chambers, and the ratio of the area of the first control surface to the area of the second control surface is substantially equal to said fraction F.

In reaction to the opposite forces exerted on its two ends, the moving member 84 is caused to move between its end positions. As a result:

in position I, the moving member 84 is moved into its end position in the direction indicated by arrow F1 (rightwards in FIGS. 8A to 8C), in which U is put into communication with P: the pressure at U thus tends towards the control pressure, i.e. the high pressure of the pump in the work configuration;

in an intermediate or neutral position N (FIG. 8C), none of the three ports G, P, U communicates with the others; and in position II (FIG. 8B), the moving member 84 is moved into its end position in the direction indicated by arrow F2 (leftwards in FIGS. 8A to 8C), and the series duct(s) (port U) are put into communication with the low-pressure circuit (port G) towards which they can remove fluid. The pressure at the port U tends towards the pressure of the low-pressure circuit.

It is possible below to understand more practically how the regulator 80 operates: the position of the moving member is in equilibrium when the pressure in the port U (series ducts) is equal to a fraction F of the pressure in the port P (control pressure). If the pressure in the series ducts reaches that value ($F \times P_{CONTROL}$), the regulator is in its neutral position. As soon as the pressure in the port U exceeds said value, the regulator removes fluid from the series duct towards the low-pressure circuit (port G). If the pressure in the series ducts is below said value, the regulator tends to cause fluid to flow from the port P to the port U (series ducts), until that pressure is reached. Finally, the pressure in the port U, connected to the series ducts, is indeed regulated to the pressure: $P_U = (S1/S2) \times P_{CONTROL}$.

For the hydrostatic transmission apparatus of any given vehicle, the optimum control fraction F for the pressure-limiting valve can be determined by testing and can usually be approximately in the range 70% to 95%. However, for special vehicles, e.g. for a vehicle in which the front and rear motors have very different cylinder capacities, the fraction F can advantageously lie in the range 40% to 60%.

The manner in which the hydraulic control can be transmitted to the chamber 87 is described in detail below.

In the above-presented embodiment (FIGS. 8A to 8C), the control pressure that is exerted in the chamber 87 comes from outside the regulator 80, by means of a link connecting the chamber 87 to the port P and outside the valve body 81.

A second embodiment of a pressure regulator is presented below with reference to FIGS. 9A to 9C. In this embodiment, the control pressure that is exerted in the control chamber (in this example, the chamber 187) is transmitted internally to the pressure regulator (180), by means of an internal duct 192 connecting the port P to the hydraulic control chamber 187. The advantage of this embodiment is that it responds faster to pressure variations than the preceding embodiment.

The shaping of the pressure regulator is very similar to the shaping presented by FIGS. 8A to 8C. The regulator is implemented in the body 181, and comprises a moving member 184 that slides in a bore 182. The second end 205 of the moving member 184 is implemented in the same way as the end 105 of the moving member 84 of FIGS. 8B and 8C, and it is subjected to the return forces of the spring 92 and to the pressure from the fluid in the port U.

Conversely, the first end 204 of the moving member 184 (on the left of FIGS. 9B and 9C) is different from the second end 104 of the moving member 84. The end of the moving member 184 is provided with a non-through axial internal cylindrical bore 188 inside which a cylindrical element 186 is placed. In the embodiment presented, this cylindrical element is a piston 186. The moving member can thus slide freely, but in leaktight manner, on the piston 186, thereby forming a second hydraulic control chamber 187 between the end-wall of the bore 188 and said piston 186, the cross-section of which chamber defines a surface of area S1. The guide part 90 is replaced with a simple leaktight stopper 190 against which the end 204 of the moving member and the piston 186 can come to bear.

The body 181 is also provided with internal ducts. The hydraulic control chamber 187 is put into communication with the port P via a first internal circuit 192 that puts it under the pressure at the port P, and that is presented above. In addition, a second internal duct 194 puts the port G into communication with the chamber 196 which is the chamber provided at the end of the bore 182 facing the stopper 190, and in which the moving member 184 slides on the piston 186. The link between the port G and the duct 194 makes it possible to fill or to empty the chamber 196 during this sliding.

As shown in FIGS. 9B and 9C, the movement of the moving member 184 results from the opposing pressures that are exerted firstly on the moving member, in the chamber 187, and secondly in the chamber 99. The equilibrium of the moving member of the pressure regulator thus corresponds to the same pressure equilibrium criterion as the embodiment shown by FIGS. 8A to 8C: $P_U = (S1/S2) \times P_{CONTROL}$.

Thus, this pressure regulator operates in the same manner as the pressure regulator presented with reference to FIGS. 8A to 8C:

in position I, the moving member 184 as moved in the direction indicated by arrow F1 makes it possible to put P and U into communication with each other, and thus the pressure in the series ducts tends to come into equilibrium with the control pressure of the regulator;

in the intermediate or neutral position N (FIG. 9C), none of the three ports G, P, U communicates with the others; and in position II (FIG. 9B), the moving member 184 is moved in the direction indicted by arrow F2, and the series ducts are put into communication with the low-pressure circuit.

This embodiment thus shows that, in said pressure limiter or regulator, the first control chamber can be connected permanently to said third port (P) via a link duct that is internal to the regulator.

It also shows that various shapes can be used for the particular shaping of the ends of the moving member. What matters essentially is that the movement of the moving member must be governed by opposing pressures, applied on respective cross-sectional areas S1 and S2.

With reference to FIG. 10, a description follows of another embodiment of the hydrostatic transmission apparatus of the invention that includes a regulator as a pressure-limiting valve.

In the transmission apparatus presented by this figure, the configuration of the motors 14, 15, 16, 114, 115, and 116, and the configuration of the pressure sensor 74 are identical to what is presented with reference to FIG. 6. However, the pressure-limiting function is obtained differently.

The pressure-limiting function is achieved by a hydraulically-controlled pressure regulator 280 that is piloted by an electronic control unit 172 through an electrical pilot stage constituted by a solenoid valve 75.

The pressure regulator 280 has three ports P, G, and U, and is of the same type as the pressure regulators 80, 180 that are described with reference to FIGS. 8A to 8C, and 9A to 9C.

The port P is connected to the high-pressure duct of the pump via two non-return valves 238. In this embodiment, by choosing two non-return valves (238) connected to respective ones of the two orifices of the pump and making it possible to select the higher pressure of the pump, rather than a shuttle-valve, the object is to prevent any return of fluid from the regulator 280 towards the high-pressure duct of the pump, the high-pressure of which the pressure at the port P might exceed.

It should also be noted that the shuttle-valves (38, 138) presented with reference to the preceding figures can be replaced with non-return valves similar to the valves 238 of FIG. 10.

The port G is connected to the low-pressure circuit 25. The port U is connected to two series ducts 18, 118, via two non-return valves 52, 152.

As appears in FIG. 10, the regulator 280 has three positions: a position I in which the series ducts are connected to the high-pressure duct of the pump; a position II in which the series ducts are connected to the low-pressure circuit; and a position N or "isolation position", in which the regulator 280 ceases to connect the series ducts 18, 118 to the low-pressure circuit 25.

The pressure regulator 280 is piloted by an electronic control unit (ECU) 172 that transmits its instructions via a pilot solenoid valve 75 and via a pilot duct 280B.

The electronic control unit (ECU) 172 has one or more memory locations and information processing means. The value of the high pressure of the pump that is processed by the ECU is delivered by a sensor 74 connected to the high-pressure duct of the pump.

In such apparatus, the pressure in the pressure regulator 280 can reach high values (up to 450 bars), which makes it difficult to use electrical control for the regulator 280. In order to mitigate this difficulty, a pilot solenoid valve 75 is provided that has an inlet port 75A connected to the low-pressure circuit 25 and an outlet port 75B connected to the pilot duct 280B, and controlled by the ECU 172. Said solenoid valve constitutes a proportional electrical pilot stage, that relays in the form a fluid pressure the command issued by the ECU 172, so that the pressure in the pilot duct 280B is actually set by the ECU 172.

The flexibility of the piloting of the regulator 280 by the ECU 172 makes it possible, with the regulator 280, to perform the following functions:

Firstly, the regulator can be inhibited, by being maintained in the isolation position N. The pressure-limiting function is then neutralized. (To this end, the isolation position should be provided at one end of the internal bore of the regulator, so as to enable the moving member to be blocked in this position. A regulator that is slightly different from the regulator shown in FIG. 10 is therefore used).

In addition, the regulator can be placed and maintained in the position II. It thus enables the apparatus to operate in a "road" configuration, in which the flow-rate passing through the upstream motors is deflected in full via the regulator 280 towards the low-pressure circuit 25. In this situation, pilot pressure that is sufficiently high to block the regulator in the position II is applied.

Finally it can be used in the work mode so as to maintain in the series ducts (i.e. at the port U) a limit pressure equal to a fraction of the pressure applied in the pilot duct 280B.

Advantageously, in the work mode, the use of the ECU gives full scope for setting the limit pressure that can be allowed in the series ducts, and thus for specifying how the pressure limitation is achieved by the regulator 280.

The ECU 172 makes it possible to choose the command transmitted to the solenoid valve 75 and thus the pressure in the pilot duct 280B. The pressure in the duct 280B is piloted to be proportional to the high pressure of the pump, with a chosen ratio. This pilot pressure can vary from zero pressure to the pressure of the low-pressure circuit.

As a function of the use that is to be made of the vehicle, the range of pressures within which the pressure at the port U must be able to vary is determined. In the example presented, this range extends from the pressure of the low-pressure circuit to twice the high pressure of the pump. The regulator 280B is chosen (ratio of the cross-sectional areas S1/S2 indicated above) in a manner such that the range of pressures in the port U corresponds to said range, for inlet pressures (in the duct 280B) varying in the range 0 to the pressure in the low-pressure circuit (the control pressure being proportional to the high pressure of the pump).

In work mode, the limit pressure in the port U is thus maintained proportional to the high pressure of the pump, in the desired range from a zero or low pressure to twice the high pressure of the pump. The ECU 172 thus makes it possible to perform direct piloting of the fraction F from the pressure in the port U to the high pressure of the pump.

In a simple version, the fraction F is fixed, and the limit pressure is a predetermined fraction of the high-pressure of the pump. Said fraction can, in particular, be set as a function of the type of machine: for a mower, the fraction is lower, for more flexibility and so as not to damage the land; for a grape harvester that requires higher torque, the fraction is higher.

In a more advanced mode of control of the apparatus, instead of being predetermined, said fraction F varies and is set or determined by the electronic control unit 172 as a function of the instantaneous parameters.

For example, the limit pressure can depend not only on the high pressure of the pump, but also on additional parameters related to operation of the vehicle. For example, said pressure can be limited to a fraction of the control pressure; but said fraction is increased and goes from 0.8 to 0.9 on a slope, if a slope is detected by an inclinometer; and, in addition, said fraction is higher when traveling in a straight line than when going round a turn beyond a steering angle detected by an inductive position sensor; and/or other similar features can be provided.

Naturally, the pressure-limiting methods presented above are preferably implemented by means of an electronic control unit, but any other system for controlling the pressure-limiting valve that is suitable for performing such functions can be used.

Naturally, the invention can be combined with known features that are specific to feed circuits for feeding series motors such as, for example, a reduction in torque on the upstream motors (in general coupled to the front wheels) of a vehicle by bypassing said motors under certain specific conditions, such as, for example, on stony ground, or on climbing a steep slope. In such a bypass configuration, the feed and discharge orifices of the upstream motors are interconnected by a bypass valve device and said motors substantially no longer deliver any torque, the vehicle thus being driven only by the total torque delivered by the downstream motors (the rear motors in general).

In a manner that is known for implementing this configuration, various bypass valve devices are used.

For example, a bypass selector is placed in parallel with the non-return valves 52, 152 and is suitable for bypassing said non-return valves so as to connect the series ducts to the delivery of the pump.

In another configuration of a bypass valve device, the non-return valves 52, 152 are replaced with piloted valves, opening of which can be caused by the high-pressure of the pump by means of a suitable circuit selector. In a first position, said piloted valves perform the same function as the non-return valves 52, 152; while in a second position, they put the series ducts into communication with the pressure-limiting valve of the invention, bringing the pressure in the series ducts to the reduced pressure procured by said pressure-limiting valve. Thus, application of such known devices to the means of the invention advantageously makes it possible to interconnect the series ducts and to maintain them at the reduced pressure by means of the pressure-limiting device, instead of maintaining them at the (high) delivery pressure of the pump. Thus the discharge from each of the upstream motors is at said reduced pressure, thereby making it possible to keep low torque generated by said upstream motors and to improve the overall efficiency of the transmission in comparison to the prior art solutions.

The invention claimed is:

1. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein said at least one pressure-limiting valve is also controlled as a function of at least one parameter relating to operating conditions of the apparatus, which parameter is chosen from among the inclination of the mobile machine, the steering angle through which the wheels of the machine are steered, or the type of mobile machine.

2. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, and wherein at least one solenoid valve is interposed between said at least one pressure-limiting valve and the first series duct, said solenoid valve having a first position in which said solenoid valve connects the at least one pressure-limiting valve to said first series duct, a second position in which said solenoid valve isolates the at least one pressure-limiting valve from said first series duct, and third position in which said solenoid valve connects the low-pressure circuit to said series duct.

3. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, the apparatus comprising an electronic control unit suitable for generating one or more control signals on the basis of at least the value of high-pressure of the pump.

4. An apparatus according to claim 3, wherein the electronic control unit is suitable for causing said at least one pressure-limiting valve to be placed in an isolation position, in which said valve ceases to connect the first series duct to the low pressure circuit.

5. An apparatus according to claim 3, wherein said linking motor is a first elementary motor of a first dual motor, and said first dual motor also has a second elementary motor that is fed by the pump in parallel with said first elementary motor and wherein the apparatus further comprises a second dual motor having a first and a second elementary motor, the first elementary motor of said second dual motor being connected firstly via a second series duct to the first linked motor, and secondly to the pump, and the second elementary motor of said second dual motor being fed by the pump in parallel with said first linking motor.

6. An apparatus according to claim 3, wherein said linking motor is a first elementary motor of a first dual motor, and said first dual motor also has a second elementary motor that is fed by the pump in parallel with said first elementary motor, wherein the apparatus further comprises a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor and wherein the apparatus further comprises a second pressure-limiting valve interposed between said second series duct and the low-pressure circuit.

7. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein at least one non-return device is interposed between said at least one pressure-limiting valve and the first series duct, so as to allow fluid to flow only from the first series duct towards said at least one pressure-limiting valve, the apparatus further comprising a controller means suitable for forcing the non-return device into the open position.

8. A hydrostatic transmission apparatus for a mobile machine having a front group of drive members and a rear group of drive members, a pump, the apparatus comprising a first linking motor and a first linked motor respectively contributing to driving a first one and a second one of the front and rear groups of drive members, the first linking motor and the first linked motor being connected via a first series duct and being respectively connected to a first orifice of the pump and to a second orifice of the pump, thereby constituting a closed transmission circuit, said linking motor being a first elementary motor of a first dual motor, and said first dual motor also having a second elementary motor that is fed by the pump in parallel with said first elementary motor, the apparatus further comprising a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor, wherein the apparatus comprises a single pressure-limiting valve interposed between at least one of the first and second series duct and a low-pressure circuit, said single pressure-limiting valve being suitable for connecting said first series duct to said low-pressure circuit while being controlled as a function of the high pressure of the pump, wherein at least one non-return device is interposed between said single pressure-limiting valve and the said at least one of the first and second series ducts, so as to allow fluid to flow only from the said at least one of the first and second series ducts towards said single pressure-limiting valve and the apparatus further comprises a controller suitable for forcing the non-return device into the open position.

9. An apparatus according to claim 7 or 8, wherein the controller comprises a solenoid valve suitable for forcing the non-return device to open by applying a pilot pressure.

10. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein at least one constriction is interposed between said at least one pressure-limiting valve and the first series duct wherein said at least one pressure-limiting valve is a hydraulically-controlled valve, controlled by a pilot duct suitable for being connected to the orifice of the pump that is at the high pressure and wherein the apparatus comprises a pilot solenoid valve with an inlet port connected to the low-pressure circuit and an outlet port connected to the pilot duct, and controlled by the electronic control unit, so that the pressure in the pilot duct is set by an electronic control unit.

11. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, the apparatus having a travel configuration in which said at least one pressure-limiting valve is suitable for connecting the first series duct to the low-pressure circuit while limiting the pressure in said first series duct to the value of the feed pressure of the low-pressure circuit, and a work configuration in which said at least one pressure-limiting valve is suitable for connecting the first series duct to the low pressure circuit while limiting the pressure in said first series duct as a function of the high pressure of the pump.

12. A hydrostatic transmission apparatus for a mobile machine having a front group of drive members and a rear group of drive members, a pump, the apparatus comprising a first linking motor and a first linked motor respectively contributing to driving a first one and a second one of the front and rear groups of drive members, the first linking motor and the first linked motor being connected via a first series duct and being respectively connected to a first orifice of the pump and to a second orifice of the pump, thereby constituting a closed transmission circuit, said linking motor being a first elementary motor of a first dual motor, and said first dual motor also having a second elementary motor that is fed by the pump in parallel with said first elementary motor, the apparatus further comprising a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor, wherein the apparatus comprises a single pressure-limiting valve interposed between at least one of the first and second series duct and a low-pressure circuit, said single pressure-limiting valve being suitable for connecting said first series duct to said low-pressure circuit while being controlled as a function of the high pressure of the pump, the apparatus having a travel configuration in which said single pressure-limiting valve is suitable for connecting the said at least one of the first and second series ducts to the low-pressure circuit while limiting the pressure in said at least on of the first and second series ducts to the value of the feed pressure of the low-pressure circuit, and a work configuration in which said at least one pressure-limiting valve is suitable for connecting the said at least one of the first and second series ducts to the low-pressure circuit while limiting the pressure in said at least one of the first and second series ducts as a function of the high-pressure of the pump.

13. An apparatus according to claim 12, having a travel configuration in which said at least one pressure-limiting valve is suitable for connecting the said at least one of the first and second series ducts to the low-pressure circuit while limiting the pressure in said at least one of the first and second series ducts to the value of the feed pressure of the low-pressure circuit, and a work configuration in which said at least one pressure-limiting valve is suitable for connecting the said at least one of the first and second series ducts to the low-pressure circuit while limiting the pressure in said at least one of the first and second series ducts as a function of the high-pressure of the pump, the apparatus comprising a solenoid valve suitable, in the travel configuration, for taking up a first position in which the pilot duct is connected to the low-pressure circuit and, in the work configuration, for taking up a second position in which the pilot duct is connected to the duct of the pump that is at the high pressure.

14. An apparatus according to claim 11 or 12, wherein a shuttle-valve connected to the two orifices of the pump makes it possible to select the higher pressure of the pump.

15. An apparatus according to claim 11 or 12, wherein two non-return valves connected to respective ones of the two orifices of the pump make it possible to select the higher pressure of the pump.

16. A hydrostatic transmission apparatus for a mobile machine having a front group of drive members and a rear group of drive members, a pump, the apparatus comprising a first linking motor and a first linked motor respectively contributing to driving a first one and a second one of the front and rear groups of drive members, the first linking motor and the first linked motor being connected via a first series duct and being respectively connected to a first orifice of the pump and to a second orifice of the pump, thereby constituting a closed transmission circuit, said linking motor being a first elementary motor of a first dual motor, and said first dual motor also having a second elementary motor that is fed by the pump in parallel with said first elementary motor, the apparatus further comprising a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor, wherein the apparatus comprises a single pressure-limiting valve interposed between at least one of the first and second series duct and a low-pressure circuit, said single pressure-limiting valve being suitable for connecting said first series duct to said low-pressure circuit while being controlled as a function of the high pressure of the pump wherein at least one constriction is interposed between said at single pressure-limiting valve and the said at least one of the first and second series ducts, wherein said single pressure-limiting valve is a hydraulically-controlled valve, controlled by a pilot duct suitable for being connected to the orifice of the pump that is at the high pressure and wherein the apparatus has a travel configuration in which said single pressure-limiting valve is suitable for connecting the said at least one of the first and second series ducts to the low-pressure circuit while limiting the pressure in said at least one of the first and second series ducts to the value of the feed pressure of the low-pressure circuit, and a work configuration in which said at least one pressure-limiting valve is suitable for connecting the said at least one of the first and second series ducts to the low-pressure circuit while limiting the pressure in said at least one of the first and second series ducts as a function of the high-pressure of the pump, the apparatus comprising a solenoid valve suitable, in the travel configuration, for taking up a first position in which the pilot duct is connected to the low-pressure circuit and, in the work configuration, for taking up a second position in which the pilot duct is connected to the orifice of the pump that is at the high pressure.

17. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, the apparatus comprising an electronic control unit suitable for generating one or more control signals on the basis of at least the value of the high-pressure of the pump, wherein said at least one pressure limiting valve is controlled on the basis of a fraction of the high pressure of the pump, said fraction being determined by the electronic control unit.

18. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein said at least one pressure-limiting valve is a pressure regulator having a first port suitable for being connected to the low-pressure circuit, a second port suitable for being connected to the first series duct, and a third port suitable for being connected to the orifice of the high-pressure pump, and a moving member suitable for being moved between a first position in which said moving member isolates the first and second ports and interconnects the second and third ports, and a second position in which said moving member interconnects said first and second ports.

19. An apparatus according to claim 18, wherein, in said pressure regulator, a first control chamber is connected permanently to said third port via a link duct internal to the regulator.

20. An apparatus according to claim 18, wherein said at least one pressure limiting valve is controlled on the basis of a fraction of the high pressure of the pump, and wherein the moving member of said pressure limiter has first and second control surfaces situated in respective ones of the first and second control chambers, and the ratio of the area of the first control surface to the area of the second control surface is substantially equal to said fraction.

21. An apparatus according to claim 17 or 20, wherein said fraction is predetermined.

22. An apparatus according to claim 21, wherein said fraction lies in the range 0.7 to 0.95.

23. An apparatus according to claim 17 or 20, wherein said at least one pressure-limiting valve is also controlled as a function of at least one parameter relating to operating conditions of the apparatus other than the high pressure of the pump and said parameter relating to operating conditions of the apparatus serves to determine said fraction of the high pressure of the pump.

24. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein said at least one pressure-limiting valve is a pressure limiter having a first port suitable for being connected to the low-pressure circuit, a second port suitable for being connected to the first series duct, and a moving member suitable for being moved between a first position in which said moving member isolates the first and second ports and a second position in which said moving member interconnects said ports, wherein said pressure limiter has a first hydraulic control chamber connected to a pilot duct, and a second control chamber acting in opposing manner relative to the first chamber, and suitable for being connected to the first series duct.

25. A hydrostatic transmission apparatus for a mobile machine having a front group of drive members and a rear group of drive members, a pump, a first linking motor and a first linked motor respectively contributing to driving a first one and a second one of the front and rear groups of drive members; the first linking motor and the first linked motor being connected via a first series duct and being respectively connected to a first orifice of the pump and to a second orifice of the pump, thereby constituting a closed transmission circuit; at least one pressure-limiting valve being interposed between said series duct and a low-pressure circuit, said at least one pressure-limiting valve being suitable for connecting said first series duct to said low-pressure circuit while being controlled as a function of the high pressure of the pump, wherein said at least one pressure limiting valve is a solenoid valve controlled by a signal determined at least on the basis of the high pressure of the pump.

26. A hydrostatic transmission apparatus for a mobile machine having a front group of drive members and a rear group of drive members, a pump, the apparatus comprising a first linking motor and a first linked motor respectively contributing to driving a first one and a second one of the front and rear groups of drive members, the first linking motor and the first linked motor being connected via a first series duct and being respectively connected to a first orifice of the pump and to a second orifice of the pump, thereby constituting a closed transmission circuit, said linking motor being a first elementary motor of a first dual motor, and said first dual motor also having a second elementary motor that is fed by the pump in parallel with said first elementary motor, the apparatus further comprising a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor, wherein the apparatus comprises a single pressure-limiting valve interposed between at least one of the first and second series duct and a low-pressure circuit, said single pressure-limiting valve being suitable for connecting said first series duct to said low-pressure circuit while being controlled as a function of the high pressure of the pump, wherein at least one solenoid valve is interposed between said single pressure-limiting valve and the said at least one of the first and second series ducts to which said pressure-limiting valve is connected, said solenoid valve having a first position in which said solenoid valve connects the pressure-limiting valve to said at least one of the first and second series ducts, a second position in which said solenoid valve isolates the at pressure-limiting valve from said at least one of the first and second series ducts and a third position in which said solenoid valve connects the low-pressure circuit to said at least one of the first and second series duct.

27. A hydrostatic transmission apparatus for a mobile machine having a front group of drive members and a rear group of drive members, a pump, the apparatus comprising a first linking motor and a first linked motor respectively contributing to driving a first one and a second one of the front and rear groups of drive members, the first linking motor and the first linked motor being connected via a first series duct and being respectively connected to a first orifice of the pump and to a second orifice of the pump, thereby constituting a closed transmission circuit, said linking motor being a first elementary motor of a first dual motor, and said first dual motor also having a second elementary motor that is fed by the pump in parallel with said first elementary motor, the apparatus further comprising a second linked motor and a second dual motor having a first and a second elementary motor, the first elementary motor of said second dual motor being connected firstly via a second series duct to the second linked motor, and secondly to the pump, and the second elementary motor of said second dual motor being fed by the pump in parallel with said first linking motor, wherein the apparatus comprises a single pressure-limiting valve interposed between at least one of the first and second series duct and a low-pressure circuit, said single pressure-limiting valve being suitable for connecting said at least one of the first and second series duct to said low-pressure circuit while being controlled as a function of the high pressure of the pump, wherein at least one constriction is interposed between said pressure-limiting valve and said at least one of the first and second series ducts, wherein said pressure-limiting valve is a hydraulically-controlled valve, controlled by a pilot duct suitable for being connected to the orifice of the pump that is at the high pressure and wherein the apparatus comprises a pilot solenoid valve with an inlet port connected to the low-pressure circuit and an outlet port connected to the pilot duct, and controlled by the electronic control unit, so that the pressure in the pilot duct is set by an electronic control unit.

* * * * *